United States Patent
Kimura et al.

[11] Patent Number: 6,108,716
[45] Date of Patent: Aug. 22, 2000

[54] DATA PROCESSING UNIT

[75] Inventors: Koichi Kimura, Kamakura; Hideaki Genma; Tsuyoshi Nakagawa, both of Hadano; Hideki Kamimaki, Fujisawa, all of Japan; Kotaro Matsuo, San Jose, Calif.

[73] Assignee: Hitachi, Ltd., Tokyo, Japan

[21] Appl. No.: 08/959,130

[22] Filed: Oct. 28, 1997

[30] Foreign Application Priority Data

Oct. 28, 1996 [JP] Japan ..................................... 8-285605

[51] Int. Cl.⁷ ...................................................... G06F 3/00
[52] U.S. Cl. .................. 710/1; 710/12; 710/72; 710/73; 455/555; 455/556; 455/73; 345/168
[58] Field of Search ........................ 395/750.08, 750.01, 395/750.06; 713/300, 324, 340; 710/1, 12, 15, 72, 73, 62, 100, 101; 709/217; 455/554, 555, 556, 557, 73, 74.1; 345/168

[56] References Cited

U.S. PATENT DOCUMENTS

| | | | |
|---|---|---|---|
| 4,287,676 | 9/1981 | Weinhaus | 40/10 R |
| 5,052,078 | 10/1991 | Hosoi | 16/297 |
| 5,253,142 | 10/1993 | Weng | 361/680 |
| 5,406,273 | 4/1995 | Nishida et al. | 340/825.51 |
| 5,630,469 | 5/1997 | Butterbaugh et al. | 165/80.3 |
| 5,644,338 | 7/1997 | Bowen | 345/168 |
| 5,717,428 | 2/1998 | Barrus et al. | 345/168 |
| 5,797,085 | 8/1998 | Beuk et al. | 455/88 |

FOREIGN PATENT DOCUMENTS 2-58820  4/1990  Japan .

Primary Examiner—Ario Etienne
Attorney, Agent, or Firm—Beall Law Offices

[57] ABSTRACT

A keyboard-detachable data processing unit which keeps a display unit stable under any condition. A link mechanism linking a system unit and a display unit comprises a guide which runs from front to back, a slider which swivels along the guide, and a swinging arm with one end on a system unit and the other end at a position between the base and the tip of the display unit, both ends capable of swiveling. The base of the display unit is on the swiveling slider, and the slider crank mechanism is composed of the display unit, slider, and swinging arm. The center of gravity G of the display unit is always within the upper area of the system unit regardless of whether the display unit is opened or closed.

18 Claims, 24 Drawing Sheets

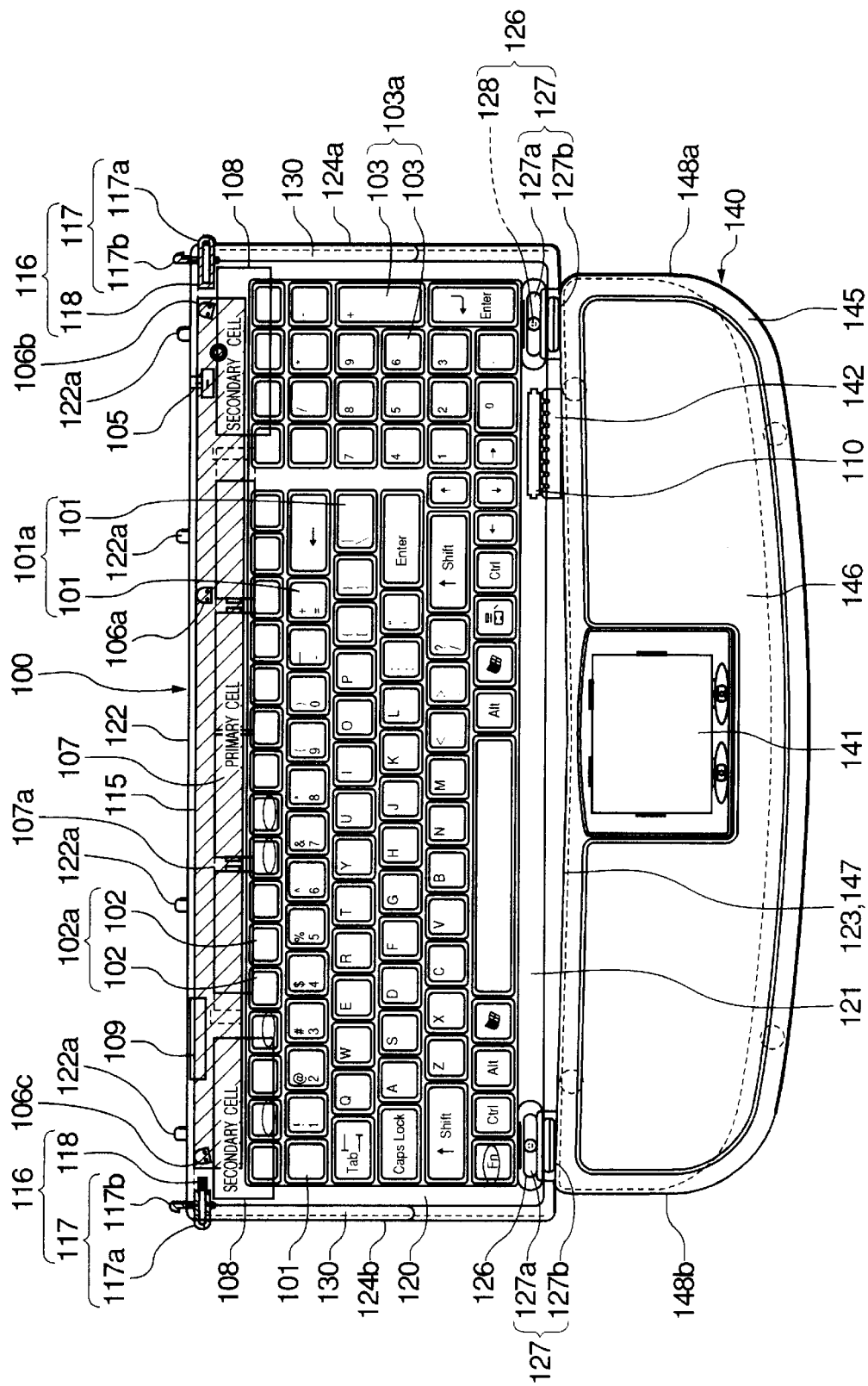

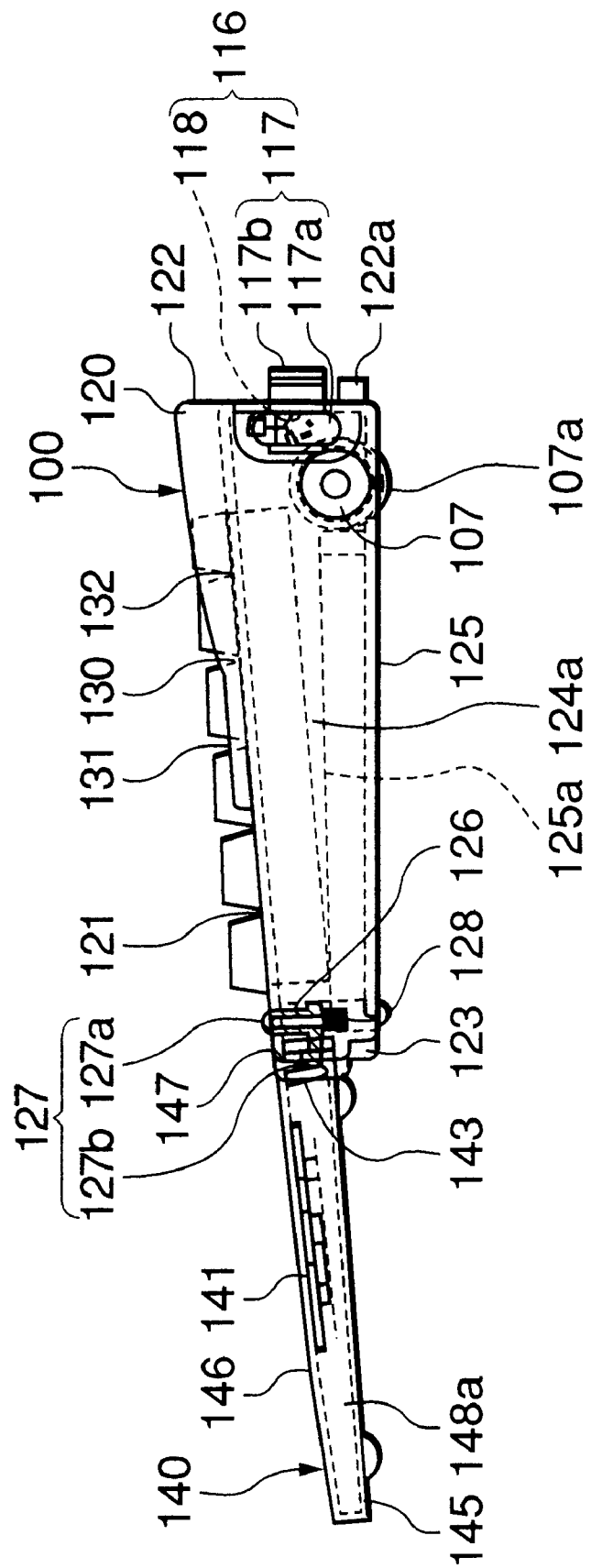

DATA PROCESSING UNIT

BACKGROUND OF THE INVENTION

1. Field of the Invention

This invention relates to a data processing unit comprising a system unit containing a CPU which executes various types of data processing, a display unit having a flat display panel, and a keyboard detachable from the system unit.

2. Description of the Related Art

Conventionally, a data processing unit called a personal computer includes a desktop computer shown in FIG. 24.

A desktop computer 1 is large in depth and takes up a lot of desktop space, partly because it uses a CRT as a display unit 2. On the other hand, many sales clerks or securities firm clerks use portable computers 3 to process or present data out of their offices. Thus, placing the desktop computer 1 as well as the portable computer 3 on the desktop significantly reduces an area available for the user.

Recently, there has been a laptop computer such as the one disclosed in Utility Model Application Publication No. 2-58820.

This type of data processing unit comprises a system unit containing such components as a CPU which executes various types of data processing, a display unit which can swivel on the system unit, and a keyboard detachable from the system unit. The detachable keyboard is provided on the front of the system unit. The display unit, which swivels on the front of the system unit, is either in the open state in which the display unit is upright or in the closed state in which the display unit lies down on the system unit. When this data processing unit is not used, the display unit is closed on the system unit, with the keyboard mounted on the system unit, to integrate the system components into one unit to save space. When this data processing unit is used, the display unit is opened and keyboard is detached from the system unit. The keyboard, detached from the system unit, improves operability.

Recently, however, the system unit becomes smaller while the display unit becomes larger, with the result that the display unit is large in relation to the system unit and depending upon the position of the display unit with respect to the system unit, the display unit and the system unit become unstable. In the worst case, the system unit becomes inclined.

In view of the foregoing, it is an object of this invention to provide a data processing unit which stabilizes the system unit ,with the keyboard detached from the system unit regardless of the position of the display unit with respect to the system unit.

SUMMARY OF THE INVENTION

A data processing unit for achieving the above object is a data processing unit composed of a system unit containing a CPU which performs various types of data processing, a display unit having a flat display panel, and a keyboard capable of being attached to or detached from the system unit, the data processing unit comprising:

link means for linking the display unit to the system unit in such a manner that the display unit is adjustable between a closed state in which the display unit is in a position face to face with the keyboard and in which a center of gravity of the display unit is at an upper area of the system unit and an open state in which the display unit stands on the keyboard and in which the center of gravity of the display unit is at the upper area of the system unit.

It is desirable that the center of gravity of the display unit be in the area where the system unit comes in contact with the display unit in the closed state or within an area surrounded by this area. The link means comprises:

a guide which is provided on the system unit and on which a guide path is formed;

a slider which has a display linking part to link said bottom portion of said display unit pivotally and an engaging part sliding on the guide path on the guide; and a swinging arm which has two end portions, one end potion being linked to the system unit pivotally, the other end portion being linked to a portion of said display unit between the bottom portion and the tip portion, wherein the display unit, the slider, and the swinging arm constitute a slider cramp mechanism.

In this case, it is desirable that the guide path on the guide extend from the connection side of the system unit to which the keyboard is connected to the back of the system unit.

It is desirable that each data processing unit described above further comprises a buffer which produces drag at least immediately before the closed state when the display unit moves from the open state to the closed state.

A second invention is a data processing unit comprising a system unit containing a CPU; and a keyboard capable of being attached to and detached from the system unit, wherein one of the system unit and the keyboard has one or more signal receiving/sending means for receiving/sending wireless signals and wherein another has a plurality of signal receiving/sending means, each having a unique position and a unique direction, for sending and receiving wireless signals to or from one or more signal receiving/sending means.

A third invention is a data processing unit comprising a system unit containing a CPU; and a keyboard capable of being attached to and detached from the system unit, wherein the system unit comprises:

a power supply circuit supplying power to active parts including the CPU; and a power supply terminal through which power is supplied from the power supply circuit to the keyboard; and wherein the keyboard comprises:

a primary cell storage part containing a primary cell supplying power to active parts on the keyboard and a secondary cell supplying power to active parts;

a power receiving terminal connected to the secondary cell and, when the keyboard is mounted on the system unit, connected to the power supply terminal on the system unit;

switching means for allowing one of the primary cell and the secondary cell to supply power to active parts on the keyboard; and control means for instructing the switching means to use one of the primary cell and the secondary cell, for detecting electrical energy of the primary cell and the secondary cell, and, upon detecting that the electrical energy of one of the primary cell and the secondary cell has dropped below a specified level, for instructing the switching means to use another cell.

A fourth invention is a data processing unit comprising a system unit containing a CPU, and a keyboard capable of being attached to and detached from the system unit, wherein the system unit has a connection side to which the keyboard is connected and a plurality of external connection terminals on the connection side.

A fifth invention is a data processing unit comprising a CPU and a board on which the CPU is installed, further comprising:

a CPU fan sending air to the CPU to cool the CPU; and a cooling fin effectively radiating heat generated by the CPU, wherein the cooling fin has a fan storage part where the CPU fan is stored and wherein the CPU, the cooling fin, and the CPU fan are integrated in such a manner that the CPU fan which is stored in the fan storage part is installed on the cooling fin and that the cooling fin is in contact with the CPU or with a board on which the CPU is installed either directly or through high thermal conductivity material.

A sixth invention is a data processing unit, further comprising:

a palm rest with a pointing device; and a keyboard composed of a top where a plurality of keys are arranged, a storage part which is under the top and into or from which the palm rest is stored and removed, and a front which is contiguous to the edge of the top and from which a user can see the plurality of keys properly, wherein the palm rest has a connection side connected to the front of the keyboard, a coupling part which couples the connection side to the front of the keyboard, and a terminal which transfers signals between the pointing device and the keyboard, and wherein the keyboard has a coupled-to part to which coupling means of the palm rest couples and a terminal which connects to the terminal on the palm rest when the keyboard is connected to the palm rest.

A seventh invention is a data processing unit comprising a system unit containing a CPU which performs various types of data processing, a display unit having a flat display panel, and a keyboard capable of being attached to or detached from the system unit, the data processing unit wherein the keyboard comprises an alphanumeric key group composed of a plurality of alphanumeric keys, a function key group composed of a plurality of function keys, and a numeric key group located next to the alphanumeric key group and composed of a plurality of numeric keys, wherein the flat display panel has a rectangular effective display and wherein a diagonal of the effective display surface of the flat display panel is longer than a side of the alphanumeric key group and shorter than a sum of the side of the alphanumeric key group and the side of the numeric key group.

BRIEF DESCRIPTION OF THE DRAWINGS

FIG. 15 is a top view of a keyboard and a palm rest of an embodiment according to the present invention.

FIG. 16 is a side view of the keyboard and a palm rest of an embodiment according to the present invention.

DESCRIPTION OF PREFERRED EMBODIMENTS

A data processing unit of an embodiment according to the present invention will now be described with reference to drawings 1 to 22.

The data processing unit in this embodiment is designed to satisfy the above object and, at the same time, the requirements of various users, including conventional desktop computer users who require high performance to do their jobs on their desktops, users who do presentations at customer's sites, users who are interested in style or size, and users who use computers both at home and in the office or in a plurality of offices.

Figure 6:
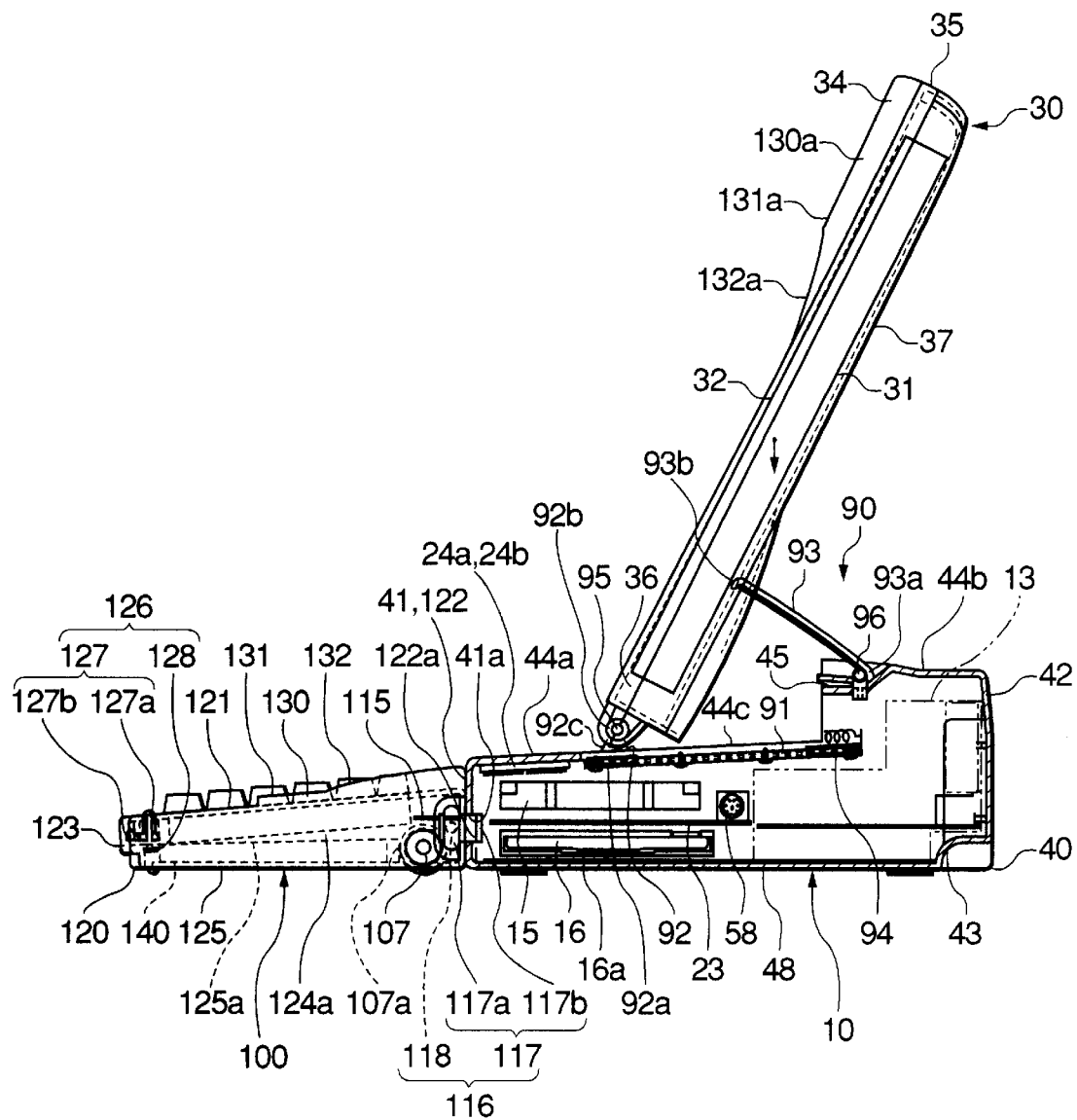
FIG. 6 is a right side cutaway view of the data processing unit of an embodiment according to the present invention (with the display unit opened).

As shown in FIG. 6, this data processing unit comprises a system unit 10 which contains a high-performance CPU to do various types of operation speedily, a display unit 30 on which processing results from the system unit 10 and so forth are displayed, a keyboard 100 detachable from the system unit 10, and a palm rest 140 which can be stored in the bottom of the keyboard 100.

Figure 3:
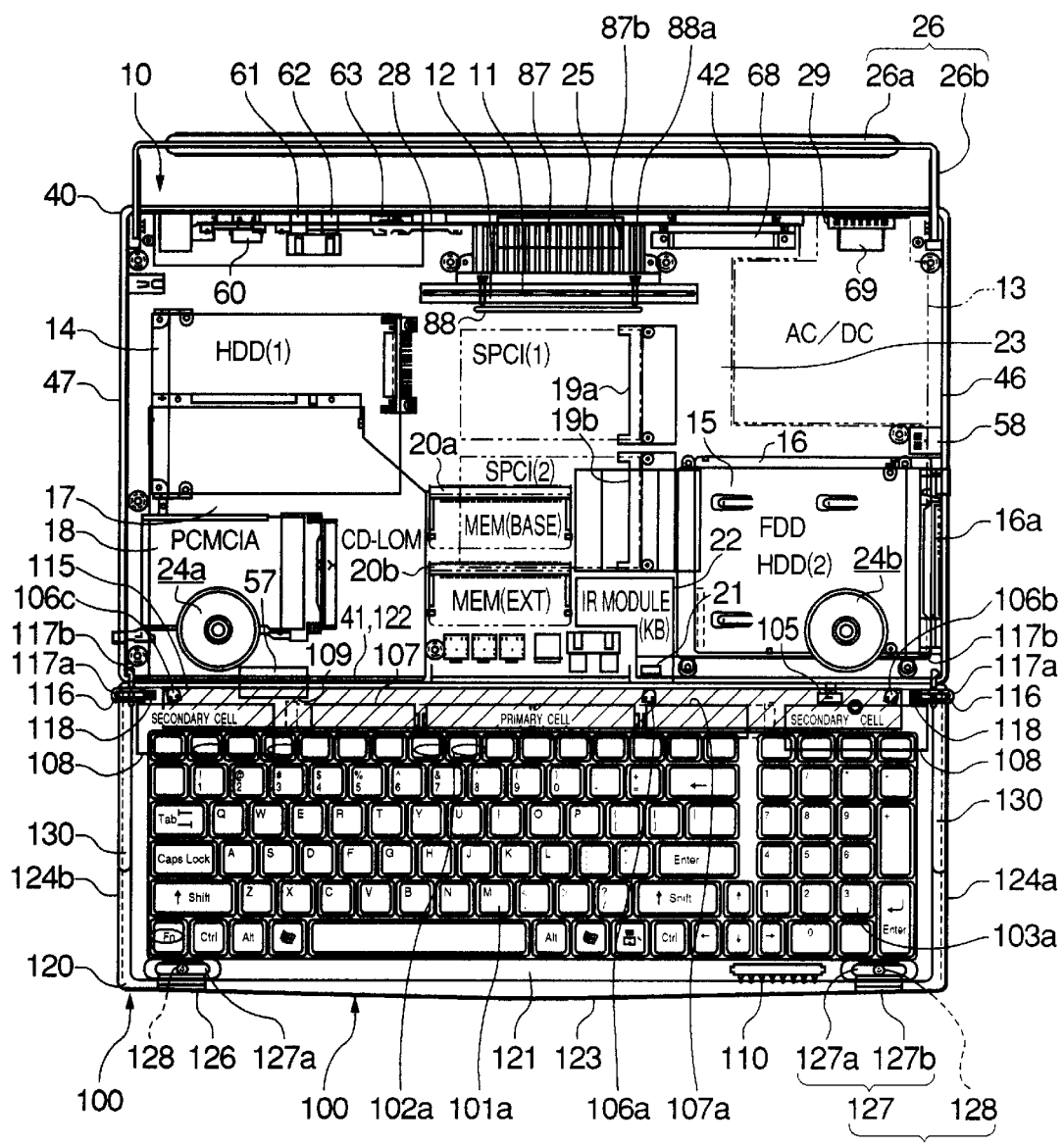
FIG. 3 is a top view of the data processing unit of an embodiment according to the present invention (with the top cover of a system unit removed).

As shown in FIG. 3, the system unit 10 comprises a CPU 11 which performs various types of operation, a memory which is not shown in the figure, an AC/DC circuit 13, two hard disk drives 14 and 15, a floppy disk drive 16, a CD-ROM drive 17, a card connector 18 for PCMCIA (Personal Computer Memory Card International Association) compliant card (hereafter called a PCMCIA card), two card slots 19a and 19b for a card (hereafter called an SPCI card) to be connected to an SPCI (Small Peripheral Component Interconnect) bus, two expansion memory slots 20a and 20b, an IR terminal 21 for sending and receiving infrared signals, a circuit 22 for the IR terminal 21, a mother board 23 on which the CPU 11 or memories are mounted, two speakers 24a and 24b, a CPU fan 25 for cooling the CPU 11, a component fan 29 for cooling the components other than the CPU 11, a cover 40 which covers those components, and a handle 26 used to carry the system unit 10.

Figure 4:
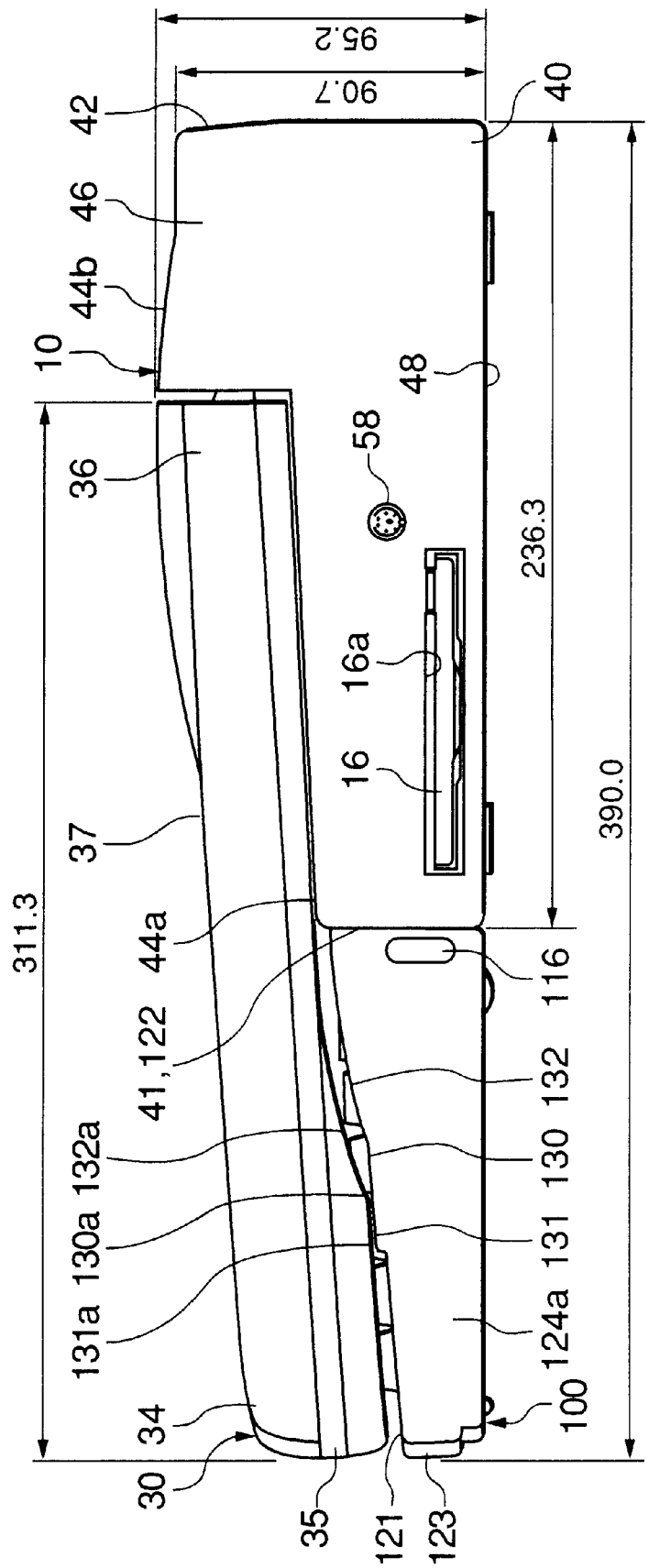
FIG. 4 is a right side view of the data processing unit of an embodiment according to the present invention (with the display unit closed).
Figure 10:
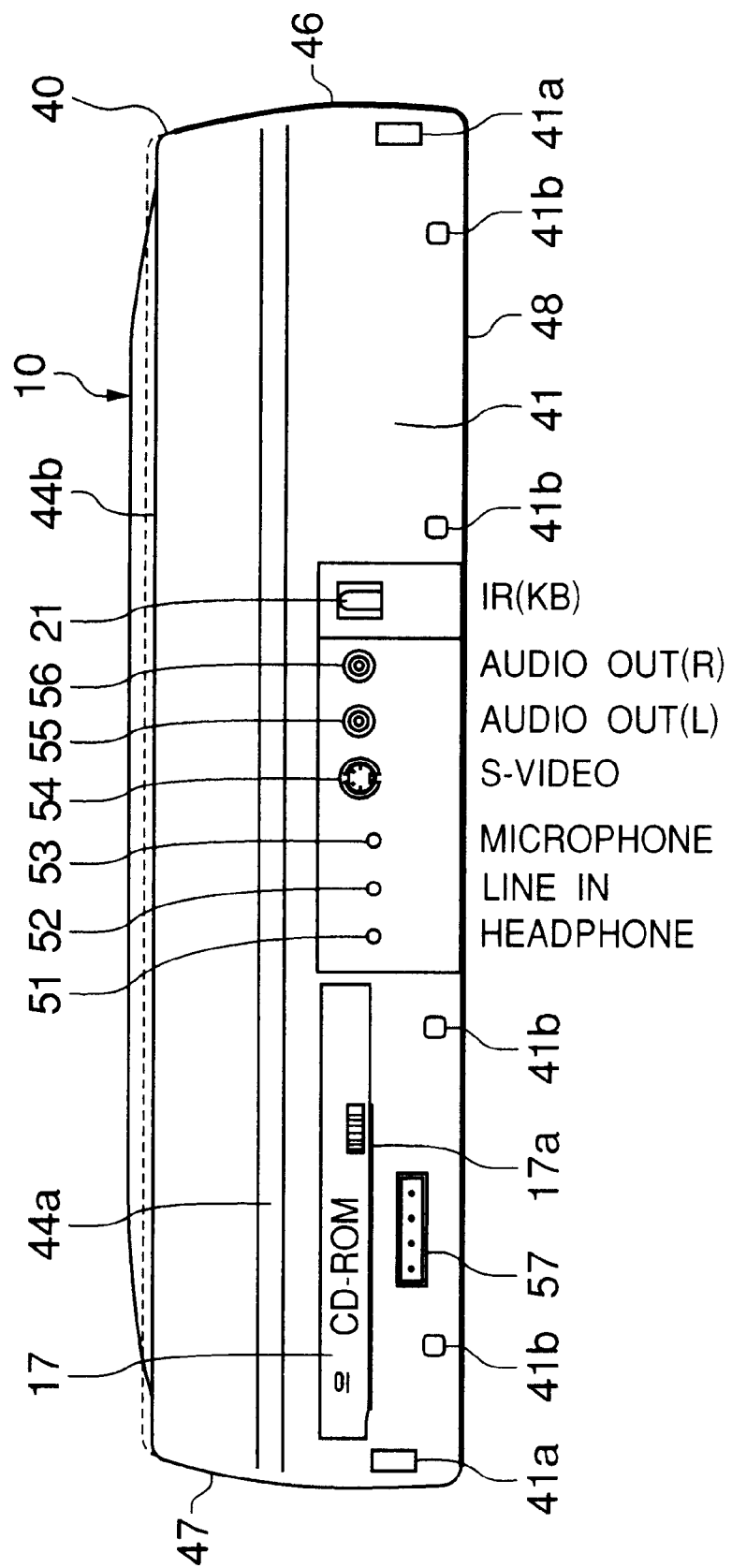
FIG. 10 is a front view of the data processing unit of an embodiment according to the present invention (with the keyboard removed).

As shown in FIGS. 4 and 10, the cover 40 has a front (connection side) 41, a back 42, a top 44, a bottom 48, and two sides 46 and 47. The top 44 has a back top 44b on the back side and a front top 44a which is at a different level to the back top 44b.

As shown in FIG. 3, there are the CPU 11, CPU fan 25, and the component fan 29 near the back side (i.e., far side) under the cover 40.

Figure 7:
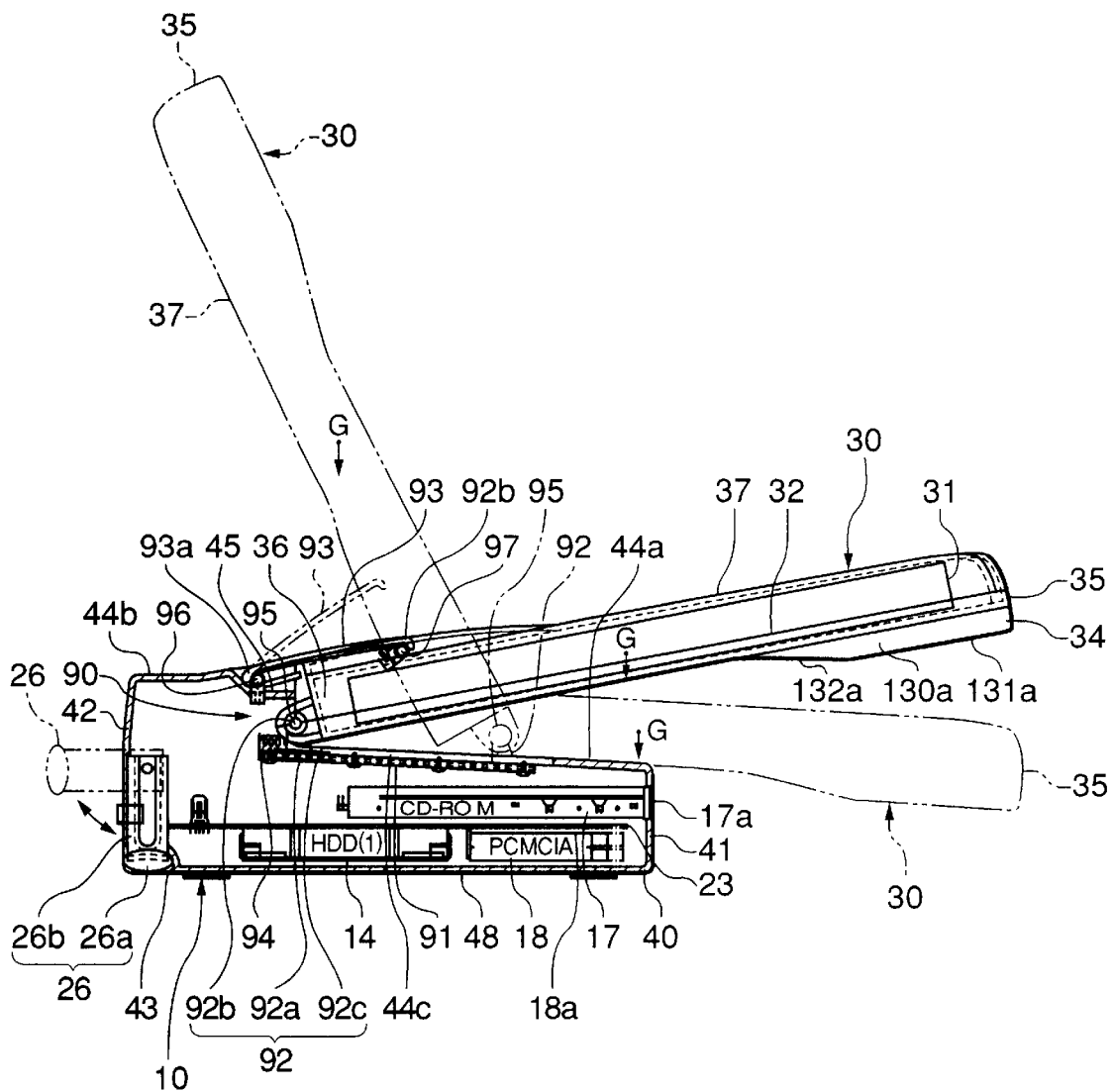
FIG. 7 is a diagram showing the operation of the display unit of an embodiment according to the present invention.
Figure 11:
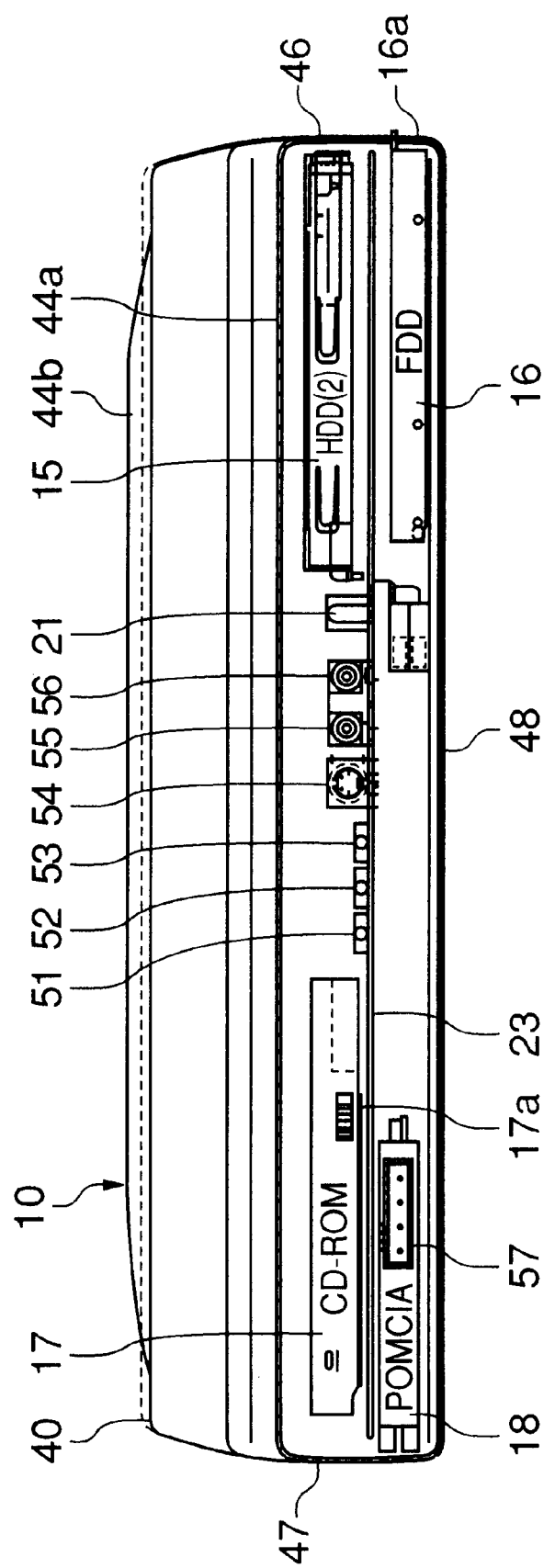
FIG. 11 is a cutaway view of the principal part of the data processing unit of an embodiment according to the present invention.
Figure 12:
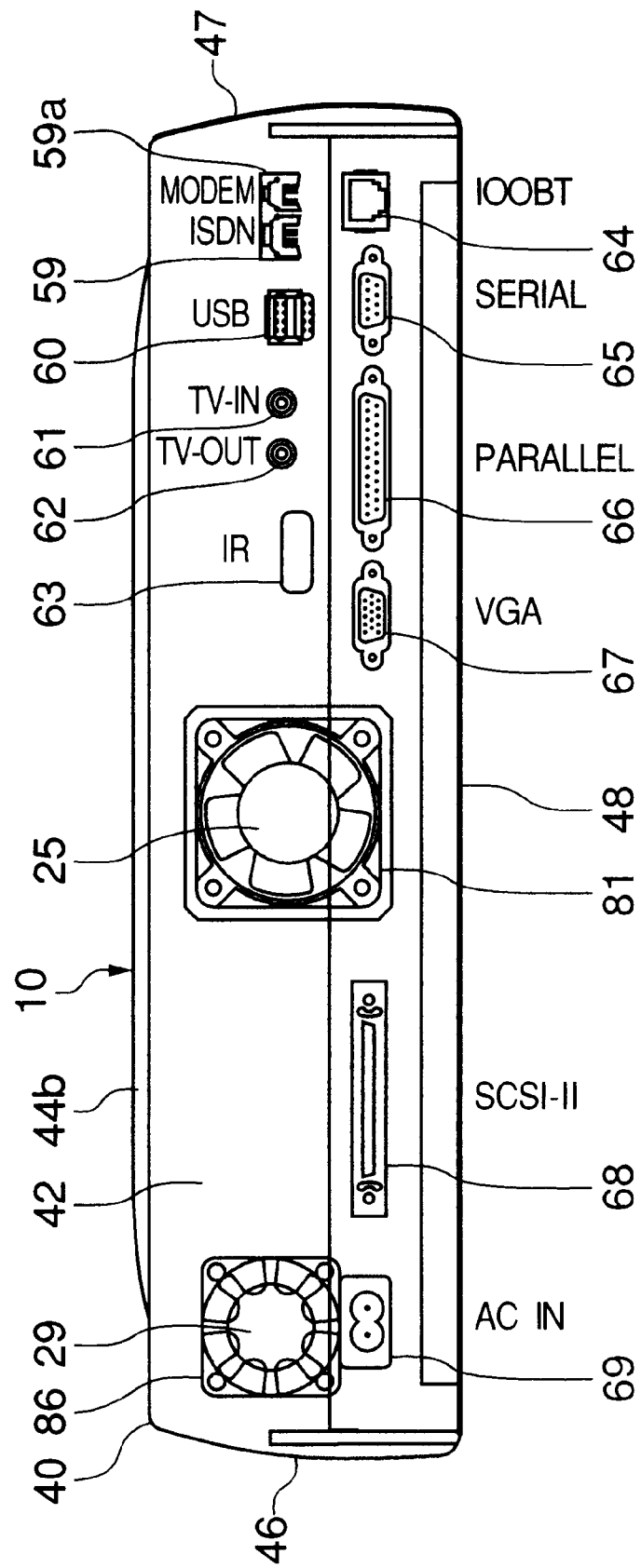
FIG. 12 is a back view of the data processing unit of an embodiment according to the present invention.

On the left-hand side under the cover 40 are a first hard disk drive 14, the PCMCIA card connector 18, and the CD-ROM drive 17, as shown in FIGS. 3, 7, and 11. The first hard disk drive 14 is on back left side and at the bottom on the mother board 23, the PCMCIA card connector 18 is on the front left side and at the bottom of the mother board 23, and the CD-ROM drive 17 is on the front left side and at the top of the mother board 23. It should be noted that a DVD (Digital Video Disk) may be used instead of the CD-ROM drive 17.

Figure 5:
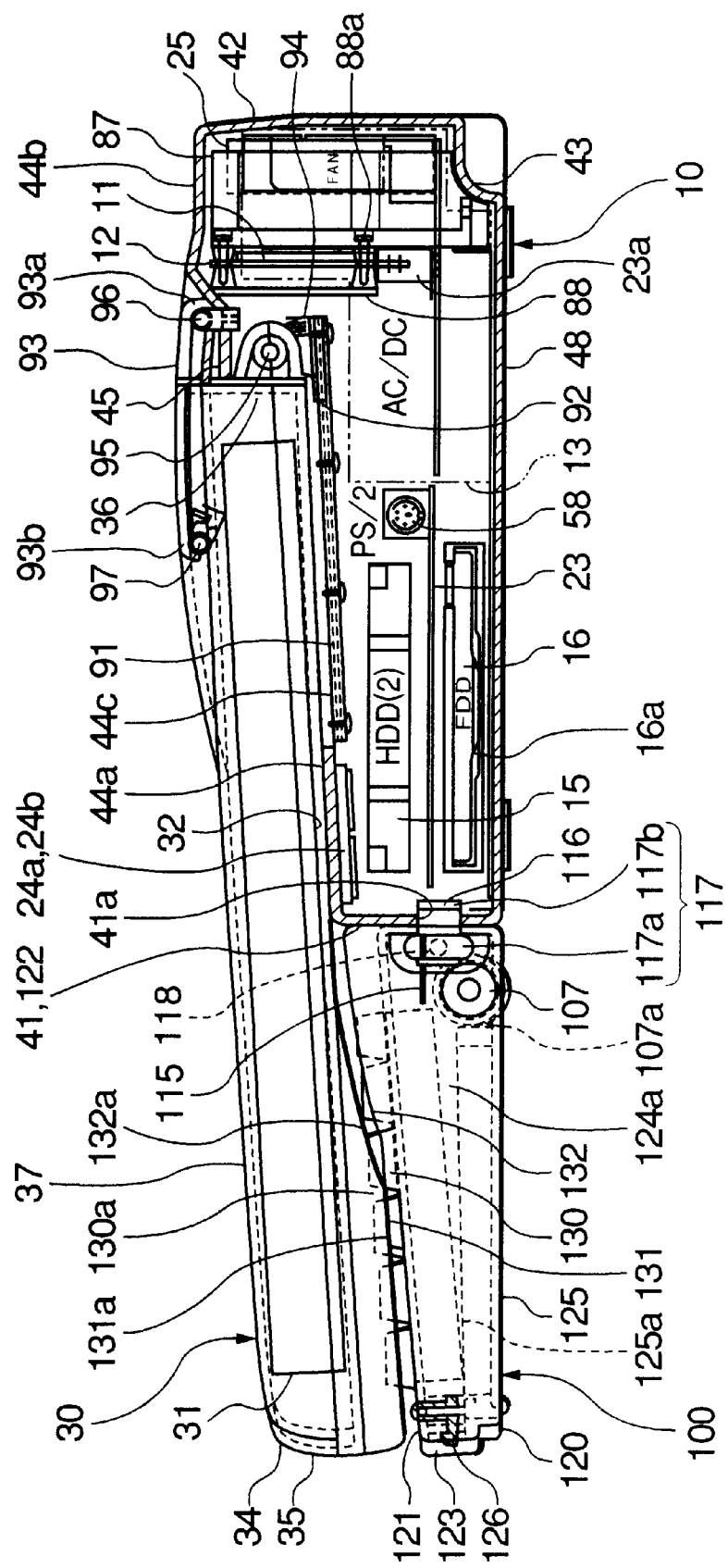
FIG. 5 is a right side cutaway view of the principal part of the data processing unit of an embodiment according to the present invention (with the display unit closed).

On the right side under the cover 40 are a second hard disk drive 15, the floppy disk drive 16, and the AC/DC circuit 13 as shown in FIGS. 3, 5, and 11. The second hard disk drive 15 is on the front right side and at the top of the mother board 23, the floppy disk drive 16 is on the front right side and at the bottom of the mother board 23, and the AC/DC circuit 13 is on the back right side.

On the front (connection side) 41 of the system unit cover 40 are a CD-ROM disc slot 17a through which a CD-ROM disc is inserted into the CD-ROM drive 17, a plurality of plugs 51, 52, . . . , 56 into which audio units and so forth are connected, the IR terminal 21 for the keyboard for transferring infrared signals with the keyboard 100, and a power supply connector 57 through which power is supplied to the keyboard. More specifically, the plugs include a headphone plug 51 to which a headphone is connected, a line-in plug 52 used for capturing sounds from an audio unit, a microphone plug 53 used to capture voice data from a microphone, an S-video plug 54 used for capturing S-video image and voice data, and voice output plugs 55 and 56. Also provided on the front 41 of the system unit cover 40 are a claw opening 41a into which a link claw 117b of the keyboard 100 will be inserted and a projection fitting hole 41b into which a link support projection 122a of the keyboard 100 is inserted. The link claw 117b and the link support projection 122a will be described later.

On the right side of the system unit cover 40 there are provided a slot 16a through which a floppy disk is inserted into the floppy disk drive 16 and a PS/2 connector 58 which is an input terminal for input units such as the keyboard 100 or a mouse and which conforms to PS/2 (Personal System)/2 (trademark of IBM, U.S.), as shown in FIGS. 4 and 5.

Although the floppy disk insertion slot 16a is provided on the right side 46 of the system unit cover 40, it may be provided on the front 41 of the system unit cover 40 as with the CD-ROM disc slot 17a. In this case, it is desirable that the floppy disk insertion slot 16a and the CD-ROM disc slot 17a be provided at a position near the top of the front 41 of the system unit 10 in such a manner that, even when the keyboard 100 is installed on the front 41 of the system unit 10, a floppy disk or a CD-ROM disc can be inserted into the slot 16a or 17a.

As shown in FIG. 7, a PCMCIA card slot 18a is provided for insertion of a PCMCIA card into an insertion connector 18 on the left side 47 of the system unit cover 40. In addition, as shown in FIG. 19, a first CPU heat exhaust port 82 is provided on the left side 47 of the system unit cover 40.

Figure 1:
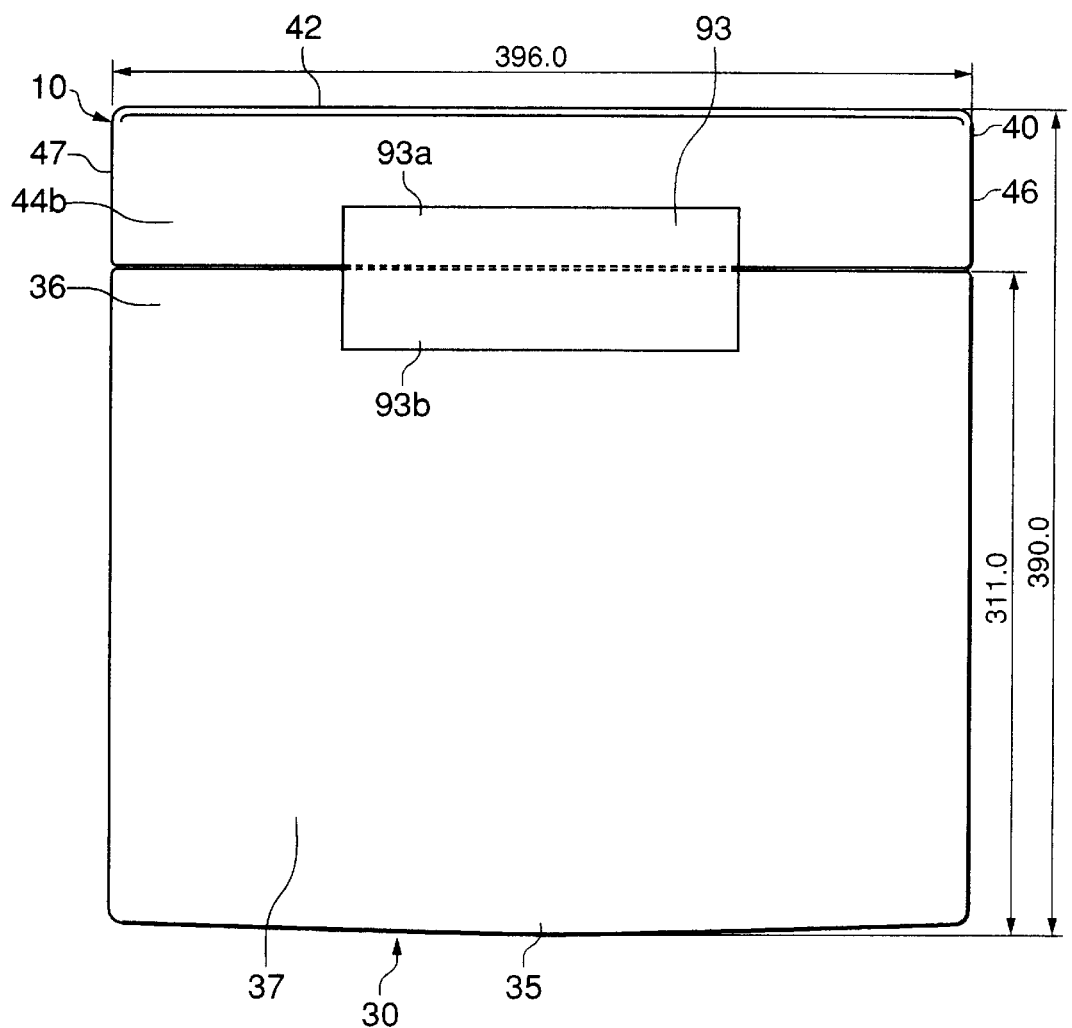
FIG. 1 is a top view of a data processing unit of an embodiment according to the present invention (with a display unit closed).
Figure 2:
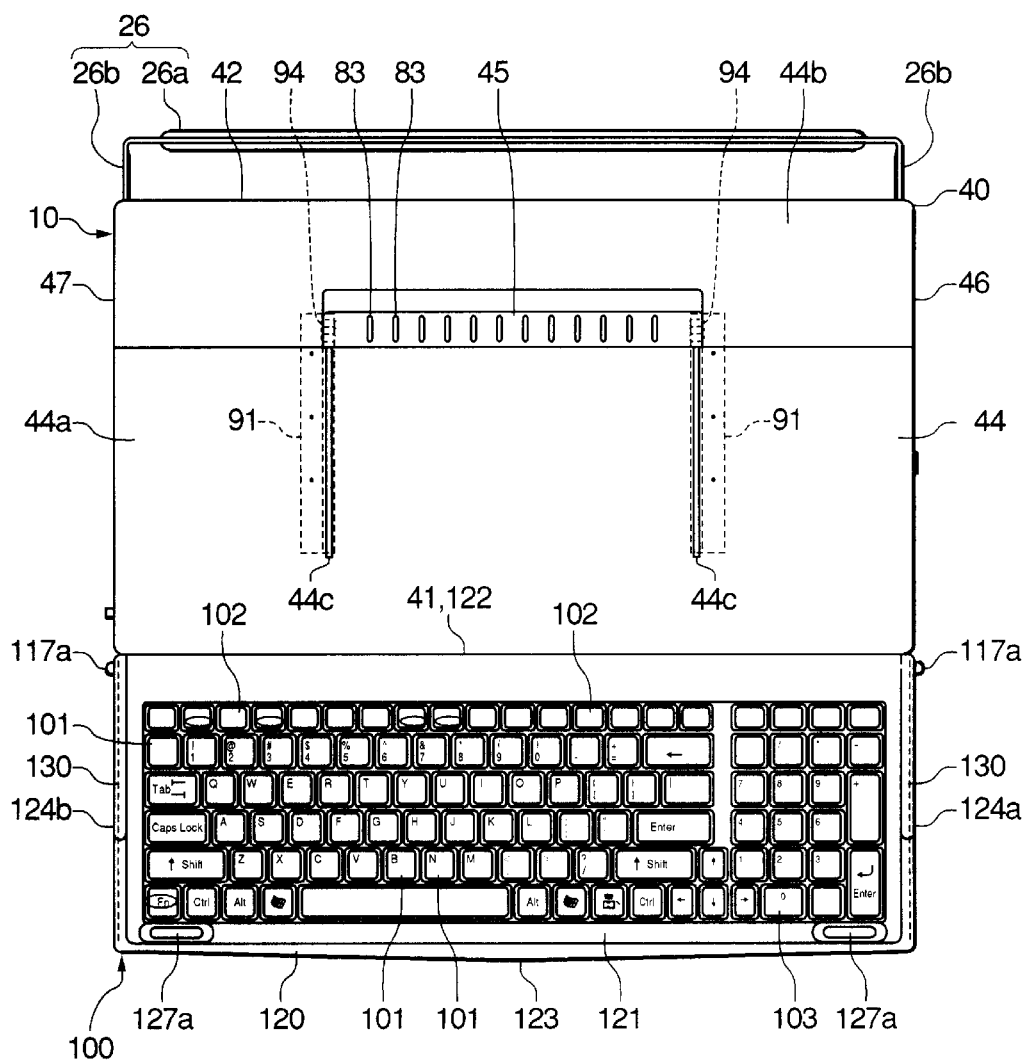
FIG. 2 is a top view of the data processing unit of an embodiment according to the present invention (with the display unit removed).
Figure 19:
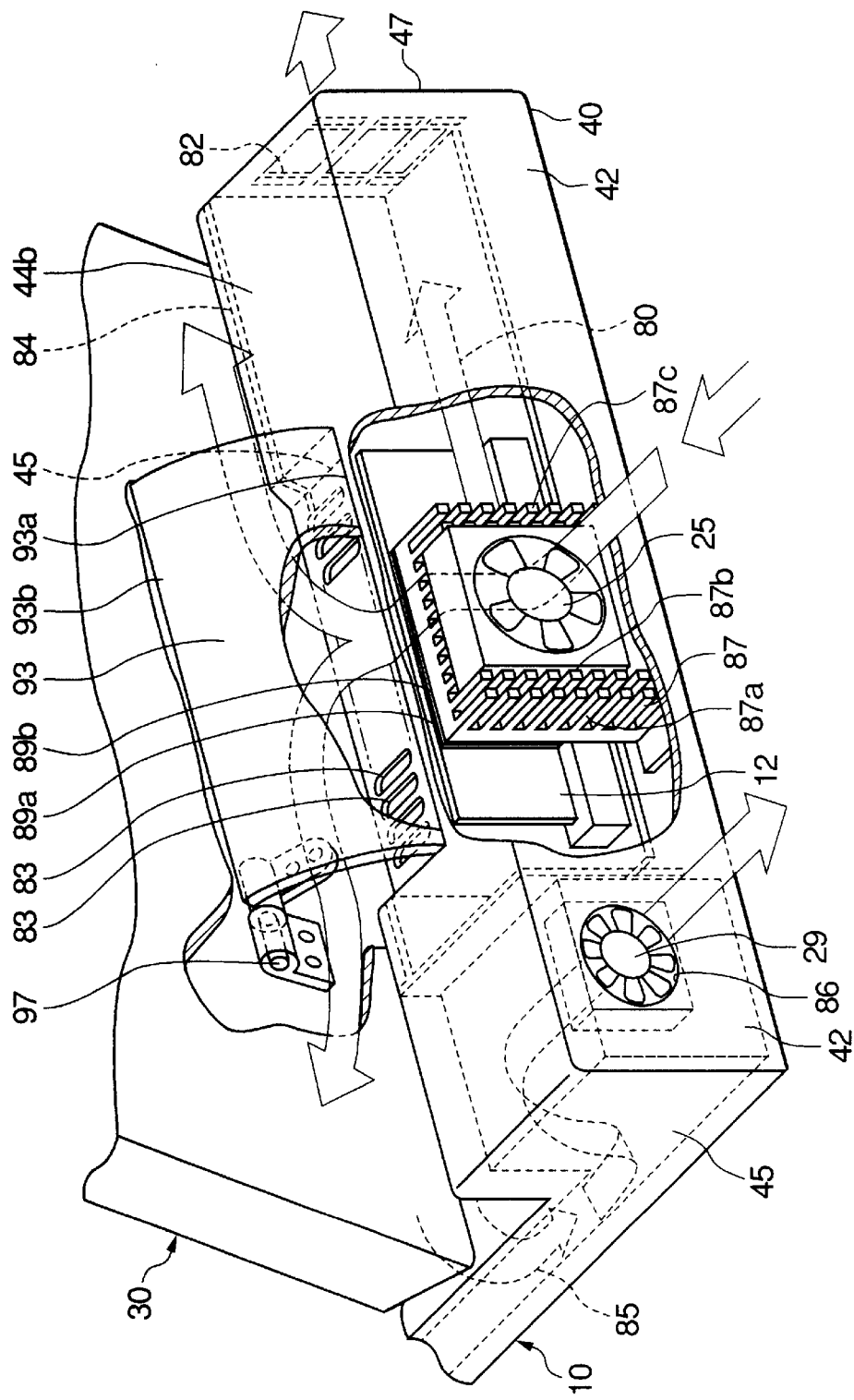
FIG. 19 is a diagram showing how air flows in the data processing unit of an embodiment according to the present invention.
Figure 20:
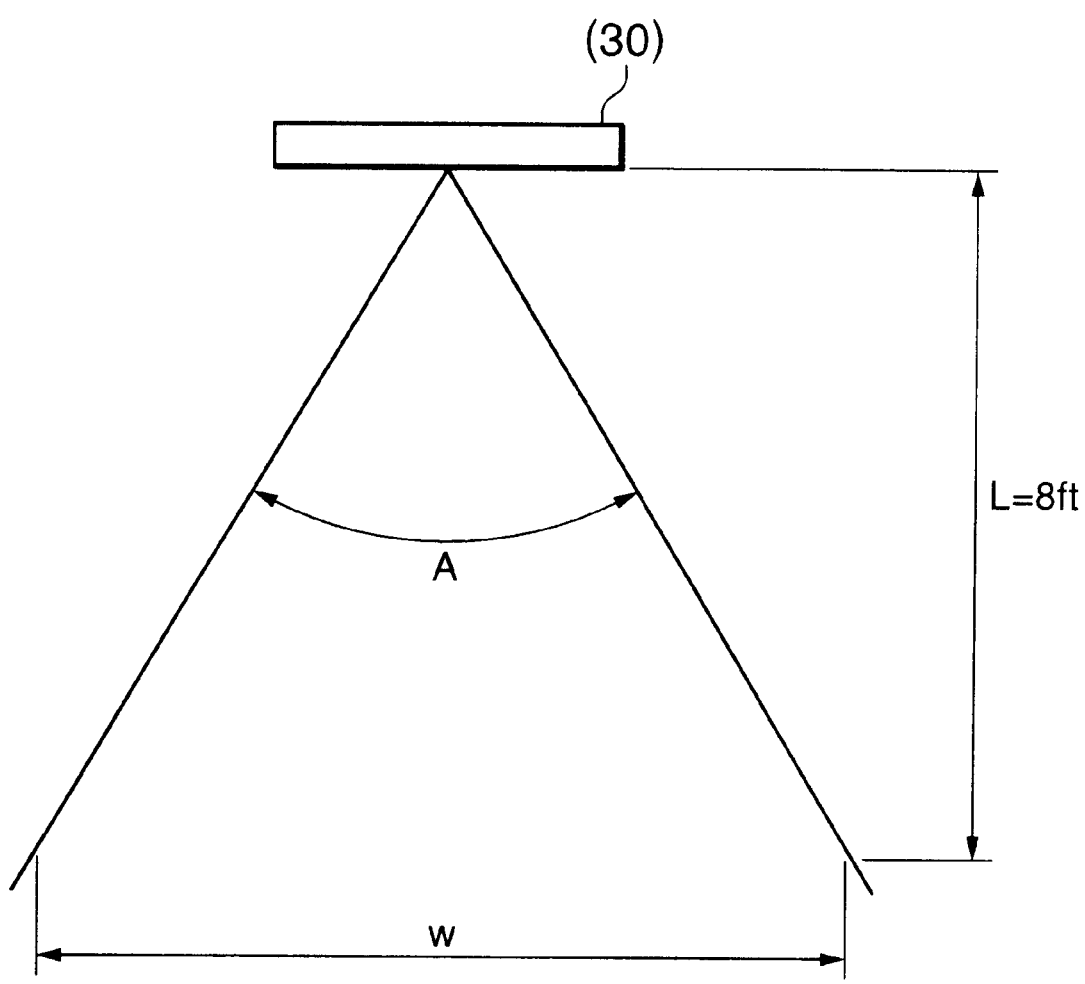
FIG. 20 is a diagram showing the viewing angle of the display unit.

On the back top 44b of the system unit cover 40 there is provided a swinging arm storage recess 45 where a swinging arm 93, a part of a link mechanism 90, to be mentioned later, linking the display unit 30 and the system unit 10, is stored, as shown in FIGS. 2 and 19. At the bottom of the swinging arm storage recess 45 there is provided a second CPU heat exhaust portion 83 which goes through from inside the system unit cover 40.

As shown in 12, a modem connector 59a, an ISDN connector 59, a USB (Universal Serial Bus) connector 60, a TV-IN plug 61, a TV-OUT plug 62, an IR terminal 63, a 100BT connector 64, a serial connector 65, a parallel connector 66, a VGA (Video Graphics Array) connector 67, a SCSI (Small Computer System Interface)-II connector 68, and an AC power supply connector 69 are provided on the back 42 of the system unit cover 40. The IR terminal 63 provided on the back 42 of the system unit cover 40 sends or receives infrared signals to or from units other than the keyboard 100, including PDA (Personal Digital Assistant) units such as an electronic pocketbook. Also provided on the back 42 of the system unit cover 40 are a CPU air intake 81 which takes in air to cool the CPU 11 and a component heat exhaust port 86 which discharges heat generated by the components other than the CPU 11. The CPU fan 25 is inside the CPU air intake 81, and the component fan 29 is inside the component heat exhaust 86.

Figure 8:
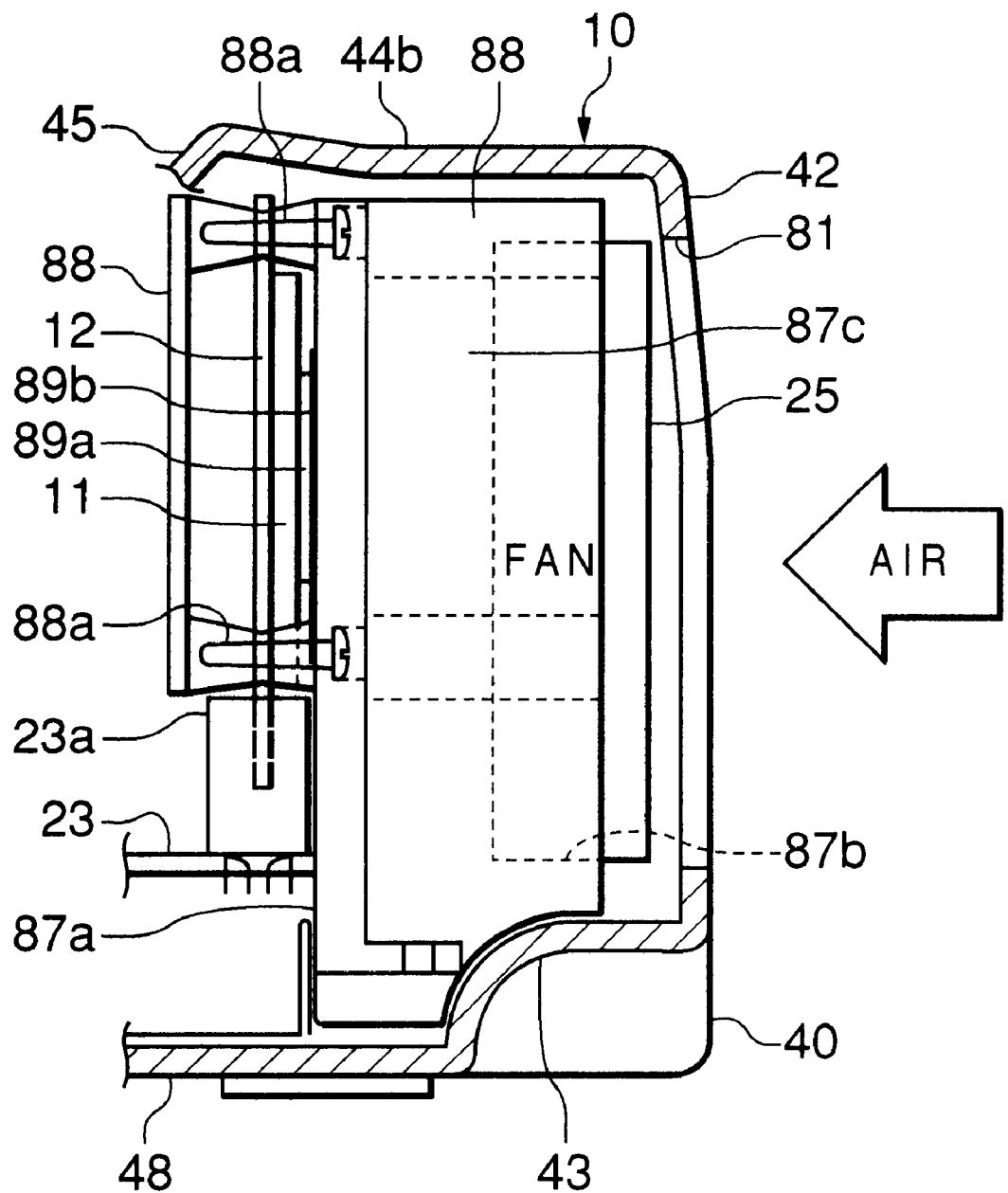
FIG. 8 is a side view of a CPU used in an embodiment according to the present invention.
Figure 9:
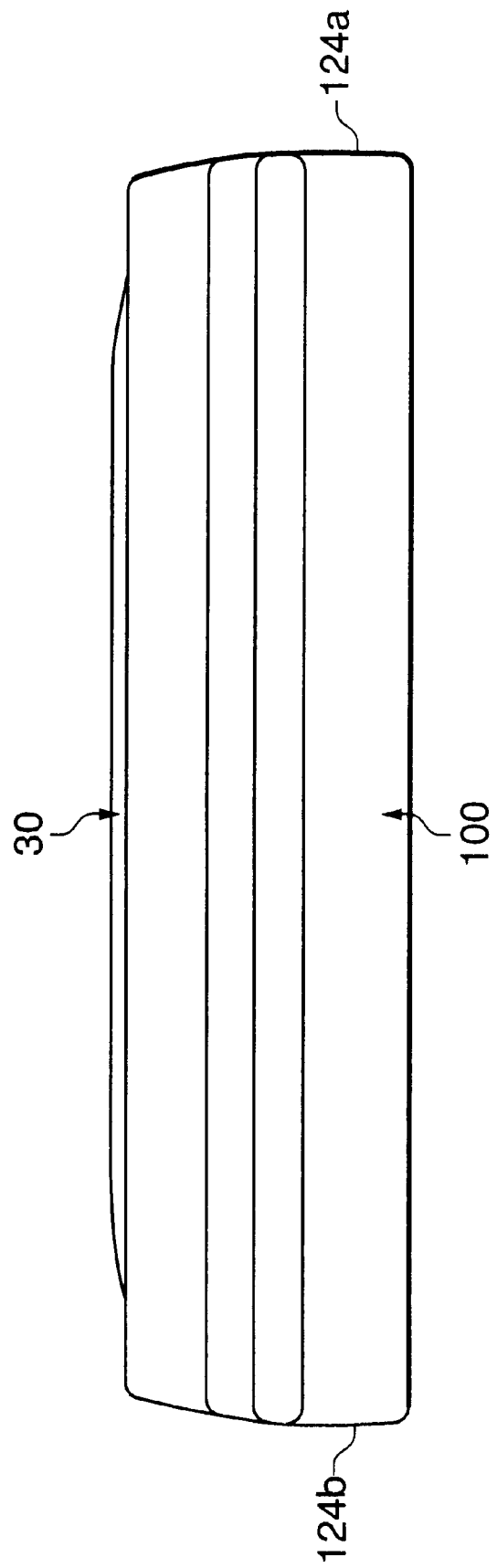
FIG. 9 is a front view of the data processing unit of an embodiment according to the present invention (with the display unit closed).

As shown in FIGS. 3, 5, and 8, the CPU chip 11 is installed on a CPU board 12. This CPU board 12, installed upright on the mother board 23, is connected via a connector 23a. A cooling fin 87 is also fixed on the CPU board 12 with screws 88a. A plane 87a of the cooling fin 87 opposed to the CPU chip 11 is flat. The CPU chip 11 has a heat transfer plate 89a, made of high thermal conductivity material, on its surface. A high-thermal-conductivity, high-flexibility heat conduction flexible-contact 89b, which is provided between the heat transfer plate 89a of the CPU chip 11 and the flat plane 87a of the cooling fin 87, is located close to the heat transfer plate 89a and to the flat plane 87a of the cooling fin 87. This heat conduction flexible-contact 89b is made of a mixture of silicon and metallic powders. In this embodiment, the CPU chip 11 and the cooling fin 87 are made to contact via the heat transfer plate 89a and heat conduction flexible-contact 89b; instead, they may be made to contact directly. To ensure that they are in contact, it is desirable that they are made to contact with each other via the heat transfer plate 89a.

On the opposite side of the flat plane 87a of the cooling fin 87 there is a fan storage 87b into which the CPU fan 25 is stored, as shown in FIG. 19. A plurality of projections 87c, which act as fins, surround the fan storage 87b. The CPU fan 25 is installed on the cooling fin 87, stored in the fan storage 87b of the cooling fin 87.

Integration of the CPU 11, the CPU fan 25, and the cooling fin 87 cools the CPU chip 11 effectively.

As shown in FIG. 8, a radiation plate 88, made of high thermal conductivity material, is provided in a position opposite to the side on which the CPU chip 11 is located, across the CPU board 12. This radiation plate 88 is fastened on the CPU board 12 with the screws 88a fastening the cooling fin 87 on the CPU board 12.

The terminals on the back 42 of the system unit cover 40 are provided on the aluminum bracket 28 which is on the back 42 of the system unit cover 40, as shown in FIG. 3. This bracket 28, is always in contact with the cooling fin 87, and efficiently radiates heat from the cooling fin 87. To allow the bracket 28 to contact the cooling fin 87, it is recommended that the above-described heat conduction flexible-contact be provided.

As described above, the cooling fin 87, as well as the radiation plate 88 and the terminal-mounted metallic bracket 28, efficiently cools the high-performance CPU 11 in which the CPU fan 25 is also provided.

As shown in FIG. 19, the CPU fan 25 provided under the system unit cover 40 takes in air from the CPU air intake 81 and sends air, warmed by the cooling fin 87 or the CPU chip 11, to the first CPU heat exhaust port 82 and a second CPU heat exhaust port 83 through the an air flow path 80. Also provided under the system unit cover 40 is an air flow path 85 through which heat generated by the parts except the CPU 11, such as the power supply circuit 13 and the hard disk drives 14 and 15, is sent to the component fan 29 and to the component heat exhaust port 86. Each of the air flow path 80 and the air flow path 85 is composed of a partition 84 between the CPU 11 and the non-CPU 11 parts and the system unit cover 40. Providing the air flow path 80 for the CPU and the air flow path 85 for the non-CPU parts under the system unit cover 40 prevents the parts from being warmed from heat from the CPU 11 and, at the same time, prevents the CPU fan 25 and the cooling fin 87, specifically designed to cool the CPU 11, from affecting the non-CPU parts.

Air warmed by the CPU 11 is sent out from the second CPU heat exhaust port 83 on the back top 44b of the system unit. This air is sent to the back 37 of the display unit 30, possibly affecting the performance of the display unit 30. To prevent this, a heat guard board made of low heat thermal conductivity material may be installed on the back 37 of the display unit 30, or the second CPU heat exhaust port 83 may be blocked to allow air warmed by the CPU 11 to be sent to the first CPU heat exhaust port 82 on the left side 47.

As shown in FIGS. 2 and 7, a handle 26 is composed of a holder 26a and two arms 26b each of which is at the end of the holder 26a. As shown in FIG. 6, a handle storage recess 43 is provided at the bottom of the back 42 of the system unit cover 40 to store the holder 26a of the handle 26. As shown in FIG. 7, the handle 26 is fastened by a screw on the back of the system unit cover 40 in such a manner that the handle 26 swivels between the storage position where the holder 26a of the handle 26 is stored in the handle storage recess 43 of the system unit cover 40 and the usage position where the holder 26a of the handle 26 is out of the handle storage recess 43 and is behind the back 42 of the system unit cover 40. The handle 26, which is provided on the back 42 of the system unit 10 as described above, allows the display unit 30 to be always closed when carrying the data processing unit by the handle 26, thus fastening the display unit 30 onto the system unit 10.

Figure 13:
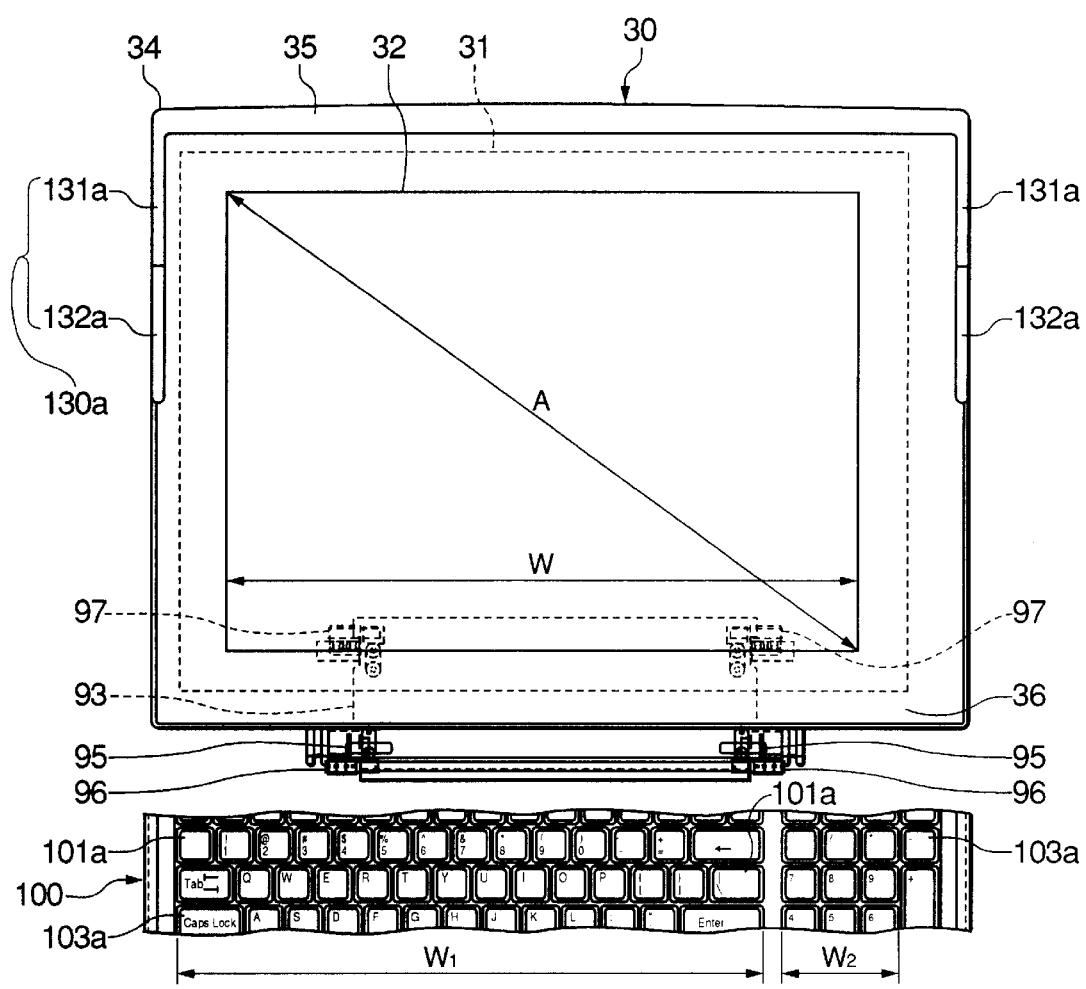
FIG. 13 is a front view of the display unit of an embodiment according to the present invention.
Figure 14:
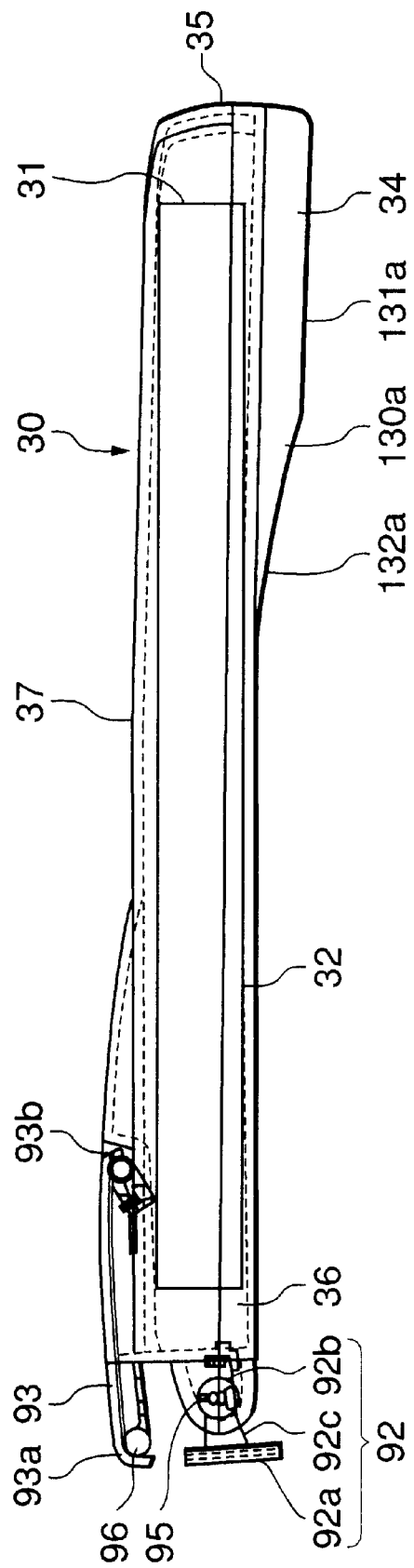
FIG. 14 is a side view of the display unit of an embodiment according to the present invention.
Figure 17A:
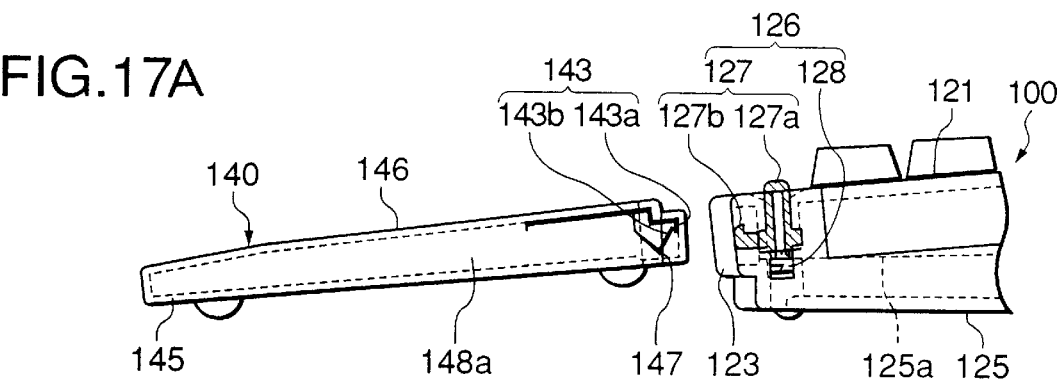
FIG. 17A is a side view of the palm rest in disengaging state of the embodiment according to the present invention.
Figure 17B:
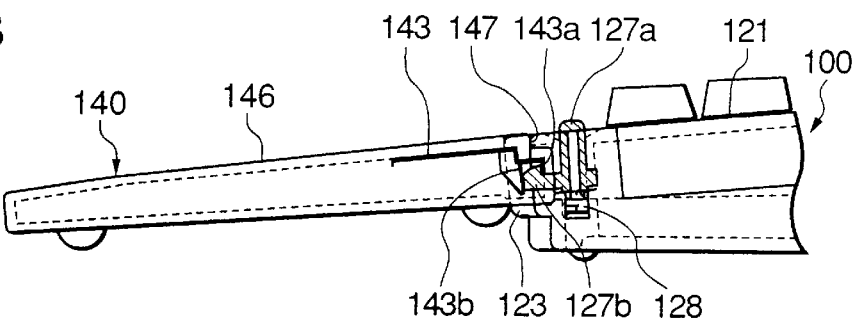
FIG. 17B is a side view of a palm rest in using state of the embodiment according to the present invention.
Figure 17C:
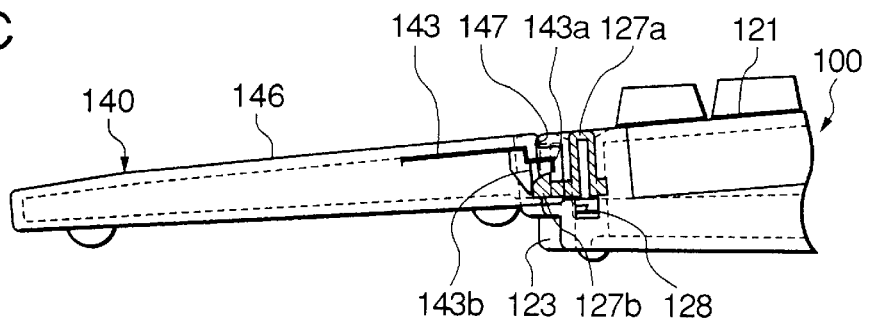
FIG. 17C is a side view of a palm rest in disengaging progress of the embodiment according to the present invention.
Figure 17D:
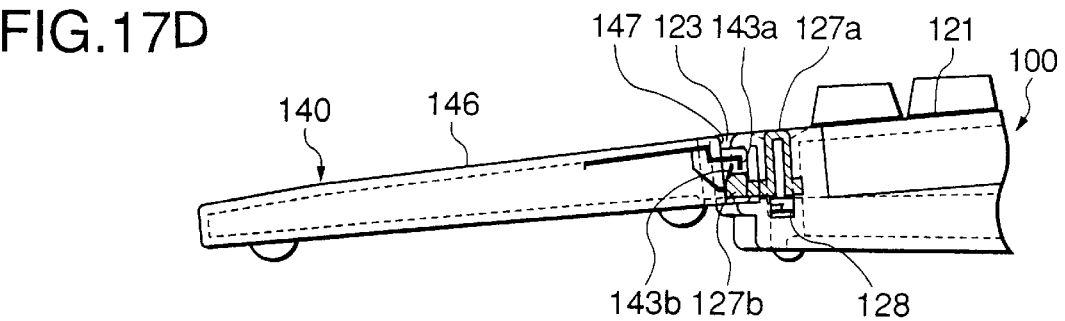
FIG. 17D is a side view of a palm rest in using state of the embodiment according to the present invention.

As shown in FIGS. 13 and 14, the display unit 30 is composed of a TFT display panel 31, one type of flat display panel, and a cover 34. The TFT display panel 31 has a rectangular effective display surface 32, with its width (W) larger than the width ($W_1$) of an alphanumeric key group 101a of the keyboard 100 which will be described later and shorter than the sum of the width ($W_1$) of the alphanumeric key group 101a and the width ($W_2$) of a ten-key group 103a. More specifically, the width (W) of the display surface 32 is 12 inches (305 mm). The depth of the display surface 32 is 9 inches (229 mm), with the diagonal (A) being 15 inches. This TFT display panel 31 is a full-color display with a viewing angle of about 160°. In this embodiment, the 15-inch TFT display panel 31 is used. A 17.5-inch display panel may be used if it can be stored within the cover 34.

The link mechanism 90 linking the display unit 30 and the system unit 10 has a guide 91 which is on the system unit 10 and which forms a guide path going from front to back of the system unit 10, a slider 92 which swivels on a base (a bottom portion) 36 of the display unit 30 and which forms a engaging part 92a running along the guide path of the guide 91, a swinging arm 93 which has one end on the back of the swinging arm storage recess 45 and the other end at a position between the base 36 and a tip 35 of the display unit 30, and a spring 94 which is on the back of the guide 91. Here, on the display panel cover 34, the base 36 is across one of the longer sides of the display surface 32 and the tip 35 is across the other of the longer sides of the display surface 32.

The guide 91 is on the front top 44a of the system unit cover 40. The slider 92 has the engaging part 92a which fits in the guide path on the guide 91, a shaft fixture (a display linking part) 92b (indicated in FIG. 14) in which a first swivel shaft 95 is installed for connection to the display unit 30, and a leg 92c which connects the engaging part 92a to the shaft fixture 92b. Behind the swinging arm storage recess 45 on the system unit cover 40 is a shaft fixture in which a second swivel shaft 96 which connects to one end 93a of the swinging arm 93 is installed. A shaft fixture in which the first swivel shaft 95 is installed is provided in the base 36 of the display unit 30. A shaft fixture in which a third swivel shaft 97, which connects to the other end of the swinging arm 93, is installed is located between the base 36 and the tip 35 on the back (surface opposite to display surface 32) 37 of the display unit 30. At one end 93a of the swinging arm 93 there is provided a shaft fixture in which the second swivel shaft 96 is installed, while at the other end 93b of the swinging arm 93 there is provided a shaft fixture in which the third swivel shaft 97 is installed.

That is, the display unit 30 links to the relatively-swiveling slider 92 through the first swivel shaft 95, and to the relatively-swiveling swinging arm 93 through the third swivel shaft 97. The swinging arm 93 links to and swivels on the system unit 10 through the second swivel shaft 96. The display unit 30, swinging arm 93, and slider 92 constitute a slider link mechanism.

As shown in FIGS. 6, 7, and 2, the front top 44a of the system unit cover 40 has a groove 44c, which goes from front to back, so that the leg of the slider 92 can pass through as it swivels on the guide 91. The spring 94 is provided at the end of the guide 91 in such a place that the leg of the slider 92 comes in to contact with the spring when the slider 92 reaches the end of the guide 91.

The display surface 32 of the display unit 30 and the front top 44a of the system unit 10 face each other when the display unit 30 is in the closed position, as shown in FIGS. 4 and 5. Both ends of the display unit 30 contact both ends of the system unit 10. With the keyboard 100 on the system unit 10, the display surface 32 of the display unit 30 also faces the top 121 of the keyboard 100. In this case, the display unit 30 covers the top 121 of the keyboard 100 completely. The center of gravity G of the display unit 30 is in the upper area of the system unit 10, as shown in FIG. 7. Thus, even when the keyboard 100 is not on the system unit 10, the system unit 10 is still stable. At this time, the spring 94 of the link mechanism 90 contacts with the slider 92, pushing the slider 92 forward and making it easy for the display unit 30 to open.

When a user lifts the tip 35 of the display unit 30 that is closed, the display unit 30 swivels on the first swivel shaft 95, the slider 92 in which the first swivel shaft 95 is provided moves forward, and the base 36 of the display unit 30 moves forward. As described above, the spring 94 on the link mechanism 90 always energizes to open the display unit 30, making it easier for the user to open the display unit 30. When the user continues to lift the tip 35 of the display unit 30, the display unit 30 swivels on the first swivel shaft 95 and the slider 92 moves more forward. In this process, the slider 92 moves away from the spring 94 of the link mechanism 90. The slider 92 moves still further forward and stops upon reaching the start of the guide path. Thus, the swinging arm 93 prevents the display unit 30 from swiveling any more, placing the display unit 30 in the completely open state.

In the completely open state, the display unit 30 is upright with respect to the system unit 10, with the tip 35 inclined somewhat backward. Even in this state, the center of gravity G of the display unit 30 is still in the upper area of the system unit 10, as shown in FIG. 7. That is, the center of gravity of the display unit 30 is always in the upper area of the system unit 10 in any state. More precisely, the center of gravity G of the display unit 30 is always in the upper area between the two sides of the front top 44a that is in contact in the display unit 30 in the closed state. Therefore, the system unit 10 is always stable.

The display unit 30, when in the open state, is preferably near the front of the system unit 10 to make the display easier to view. When in the closed state with the keyboard 100 mounted, it is preferably near the back of the system unit 10 to ensure stability as long as it covers the keyboard 100. To satisfy the above two requirements, this embodiment uses the slider crank mechanism to allow the display unit 30 to swivel and slide.

The display unit 30 that is not in the completely open state, with the tip 35 a little more forward than it is in the completely open state, can maintain its posture. This is partly because there is a friction between each swivel shaft and its fixture and between the slider 92 and the guide 91 and partly because both the slider 92 and the swinging arm 93 support the display unit 30.

To place the display unit 30 that is in the open state into the closed state, the tip 35 of the display unit 30 must be lowered. Then, the display unit 30 is closed according to the reverse steps. Immediately before the display unit 30 enters the closed state, the display unit 30 comes in contact with the spring 94 on the link mechanism 90. This spring 94 works as a buffer to avoid a mechanical shock when the user closes the display unit 30 rapidly.

In this embodiment, the spring 94 is at the far end of the guide 91 so that the display unit 30 comes in contact with the spring 94 only in the closed or near-closed state. The spring 94 may be installed on the front part of the guide 91. That is, the spring 94 may be installed with one end on the system unit cover 40 at or near the front of the guide 91 and with the other end on the slider 92. This structure causes the display unit 30 to be energized to be opened regardless of the state of the display unit 30. When the display unit 30 is in the closed state, the spring fully expands and its spring force becomes large, making the spring an efficient buffer.

Although the spring 94 is used in this embodiment, an air or gas cylinder may be used instead. In this case, a cylinder casing is a guide, a cylinder piston is a slider, and air or gas is a buffer. Alternately, a rack may be used as a guide with a rack-fitting pinion as a slider. In this case, a silicon gear may be used as the pinion. The silicon gear has silicon grease between the gears and shaft, and this grease works as a buffer.

As shown in FIGS. 15 and 16, the keyboard 100 comprises a plurality of keys 101, 102, and 103, a mount detection sensor 105 which detects that the keyboard is mounted on the system unit 10, three IR terminals 106a, 106b, and 106c which send or receive infrared signals to or from the IR terminal 21 for the keyboard of the system unit 10, a primary cell storage 107a where a primary cell 107, a battery, is stored, secondary cells 108, 108 which can be charged, a power reception connector 109 connected to the power supply connector 57 of the system unit 10 when the keyboard is mounted on the system unit 10, a palm rest connector 110 for sending or receiving signals to or from the palm rest 140, a circuit board 115 on which a keyboard circuit 111 (shown in FIG. 18) is provided, a system unit link mechanism 116 for use in linking to the system unit 10, a palm rest link mechanism 126 for use in linking to the palm rest 140 which is available for use, and a cover 120 which covers all these components.

The keyboard cover 120 is composed of a top 121, a back (connection side) 122, a front 123, two sides 124a and 124b, and a bottom 125. On the bottom 125 of the cover 120 there is a palm rest storage 125a which installs the detachable palm rest 140.

On each side of the keyboard 100 there is provided a projected wall 130 which is above the top 121, as shown in FIGS. 2 and 5. A projected wall 130a, projected above the display surface 32, is also provided on both sides of the cover 34 of the display unit 30, as shown in FIGS. 5 and 13. On each of the projected walls 130 and 130a, a flat part 131 or 131a is provided. When the keyboard 100 is mounted on the system unit 10 and the display unit 30 is closed, the keyboard 100 and the display unit 30 come in contact with each other on these flat parts. Therefore, when the keyboard 100 is mounted on the system unit 10 and the display unit 30 is closed, the keyboard 100, in conjunction with the system unit 10, supports the closed display unit 30. In addition, behind the flat part 131 of the projected wall 130 of the keyboard 100 there is a curved part 132 which curves gently upward as it goes toward the back of the keyboard. Similarly, on the base side of the flat part 131a of each of the projected walls 130a on the display unit 30, there is a curved part 132a which curves gently downward as it goes toward the base. When the keyboard 100 is mounted on the system unit 10 and the display unit 30 is closed, the curved parts 132 and 132a face each other but are not in contact. This means that, when the keyboard 100 is mounted on the system unit 10 and the display unit 30 is closed, the keyboard 100 may be pulled forward away from the system unit 10 easily because there is clearance between the two curved parts 132 and 132a. When the keyboard 100 is pulled slightly forward and the two curved parts 132 and 132a come in contact, the curved part 132a of the display unit 30 pushes the curved part 132 of the keyboard 100, causing the tip 35 of the display unit 30 to open slightly. Thus, when the keyboard 100 is pulled away from the system unit 10 with the keyboard 100 mounted on the system unit 10 and with the display unit 30 closed, this mechanism, in conjunction with the spring 94 on the link mechanism 90 described above, causes the tip 35 of the display unit 30 to be raised gently without having to open the display.

Each of the key groups 101, 102, and 103 projects above the top 44 of the keyboard cover 120. A plurality of key types 101, 102, and 103 are composed of a plurality of alphanumeric keys (alphabetic, kana, numeric, and symbolic keys) 101, 101, . . . , a plurality of function keys 102, 102, . . . , and a plurality of numeric keys 103, 103, . . . . An alphanumeric key group 101a, composed of a plurality of alphanumeric keys 101, 101, . . . , is located slightly to the left of the center of the top 121 of the keyboard cover 120. A function key group 102a, composed of a plurality of function keys 102, 102, . . . , is located primarily around the alphanumeric key group 101a. A numeric key group 103a, composed of a plurality of numeric keys 103, 103, . . . , is located to the right of the alphanumeric key group 101a. A spacing between each key, a key pitch, is 19.05 mm. This keyboard 100 is what we call a full keyboard. This embodiment uses a full keyboard with man-machine interface in mind.

Figure 22:
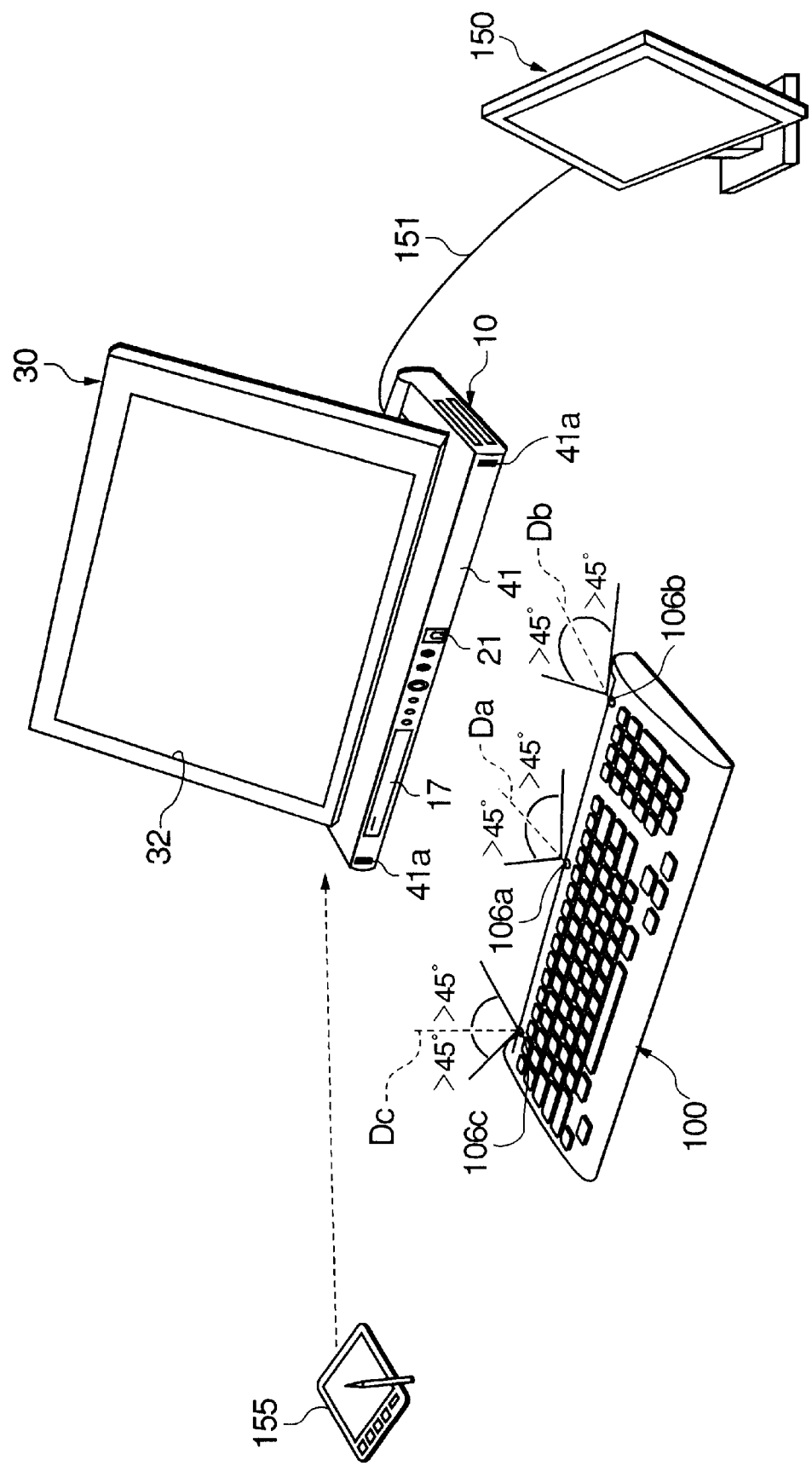
FIG. 22 is a diagram showing how the data processing unit of an embodiment according to the present invention is used. (2)

The mount detection sensor 105, three IR terminals 106a, 106b, and 106c, and power reception connector 109 are provided on the back of the keyboard cover 120. One of three IR terminals, 106a, is located in such a place that, when the keyboard 100 is mounted on the system unit 10, it faces the IR terminal 21 for the keyboard of the system unit 10, with the remaining two IR terminals on the right side and left side of the keyboard cover 120, one on each side. As shown in FIG. 22, the right-side IR terminal 106b is provided on the keyboard 100 with the signal transmission/reception direction Db inclined more than ten degrees toward the right. The left-side IR terminal 106c is provided on the keyboard 100 with the signal transmission/reception direction Dc inclined more than ten degrees toward the left. Each of IR terminals 106a, 106b, and 106c can send or receive infrared signals in the range equal to or larger than 45 degrees with the signal transmission/reception direction Da, Db, or Dc as its main direction. In addition as shown in FIGS. 5, 14, and 15, there is a link support projection 122a on the back 122 of the keyboard cover 120 (connection side) which fits into the projection fitting hole 41b on the front 41 (connection side) of the system unit 10 when the keyboard 100 is mounted on the system unit 10.

The system unit link mechanism 116 is provided on the right and left sides on the back of the system unit cover 40. Each system unit link mechanism 116 has a link unit 117 which links to the system unit 10 and a spring 118 which energizes the link unit 117 sideways. The link unit 117 has a push-button 117a for use by the user and the link claw 117b which fits into the claw opening 41a on the front 41. On the right-side system unit link mechanism 116, the push-button 117a on the link unit 117 projects over the right side 124a of the keyboard cover 120, and the spring 118 energizes the link unit 117 toward the right. On the left-side system unit link mechanism 116, the push-button 117a on the link unit 117 projects over the left side of the keyboard cover 120, and the spring 118 energizes the link unit 117 toward the left.

When the keyboard 100 is mounted on the system unit 10, the link claw 117b of the link unit 117 fits into the claw opening 41a of the system unit 10, with the push-button 117a of the link unit 117 projecting over the sides 124a and 124b of the keyboard cover 120. The link unit 117 retains its posture through the spring 118. Also, at this time, the link support projection 122a of the keyboard 100 fits into the projection fitting hole 41b on the system unit 10. Pushing the push-button 117a of the link unit 117 against the spring 118 causes the keyboard 100 to be detached from the system unit 10. Then, the link claw 117b of the link unit 117 also moves, releasing the link claw 117b from the claw opening 41a on the system unit 10 and thus allowing it to be pulled away from the claw opening 41a. In this state, moving the keyboard 100 forward with respect to the system unit 10 causes the link claw 117b to be disconnected from the claw opening 41a on the system unit 10, the link support projection 122a to be moved away from the projection fitting hole 41b on the system unit 10, and then the keyboard 100 to be detached from the system unit 10. The link claw 117b of the link unit 117 prevents the keyboard 100 from being pulled forward with respect to the system unit 10, while the link support projection 122a prevents the keyboard 100 being moved in all directions (up, down, right, and left)

The palm rest connector 110 is provided on the front 123 of the keyboard cover 120.

The palm rest link mechanism 126 is on each side of the front of keyboard cover 120. The palm rest link mechanism 126, like the system unit link mechanism 116, has a link unit 127, composed of a push-button 127a and a link claw 127b, and a spring 128 which energizes the link unit 127 into a fixed direction. The palm rest link mechanism 126 is energized upward with the spring 128, with the push-button 127a of the link unit 127 usually projecting over the top 121 of the keyboard cover 120. The operation of the palm rest link mechanism 126 will be described after the configuration of the palm rest 140 is described.

Figure 18:
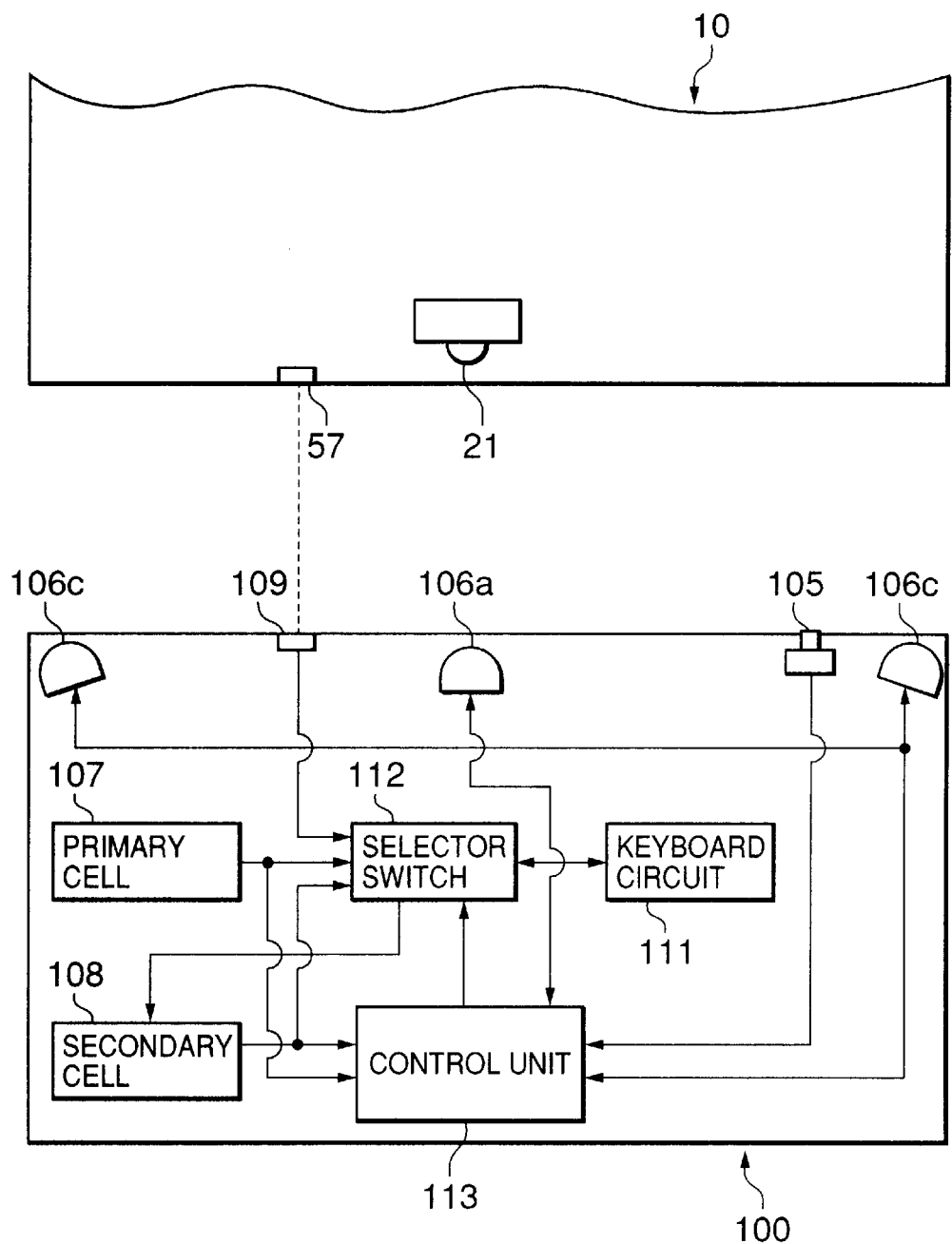
FIG. 18 is a block diagram of the keyboard circuit of an embodiment according to this invention

In addition to the above components, the keyboard 100 has a selector switch 112 which switches power from the primary cell 107 to the keyboard circuit 111 and from the secondary cell 108 to the keyboard circuit 111 and a control unit 113 which controls the selector switch 112 and three IR terminals 106a, 106b, and 106c, as shown in FIG. 18. The power reception connector 109 on the keyboard 100 is connected to the secondary cell 108 via the selector switch 112.

The control unit 113 also detects the electrical energy of the primary cell 107 and the secondary cell 108. This may be done by checking either a change in the voltage of the cell or the operation time of the keyboard circuit 111 and so forth. The control unit 113 always checks if the mount detection sensor 105 is held to determine that the keyboard 100 is mounted on the system unit 10. The IR terminal 21 for the keyboard of the system unit 10 issues the status signal indicating whether the system unit 10 is in the sleep status or in the active status. The IR terminals 106a, 106b, and 106c on the keyboard 100 receive this signal and, through this signal, the control unit 113 recognizes the status of the system unit 10.

While the keyboard 100 is mounted on the system unit 10, the power supply connector 57 of the system unit 10 is connected to the power reception connector 109 of the keyboard 100. This structure allows the power to be supplied from the system unit 10 to the secondary cell 108 via the connectors 57 and 109 and via the selector switch 112. However, upon detecting that the secondary cell 108 is fully charged, the control unit 113 issues an instruction to the selector switch 112. Upon receiving this instruction, the selector switch 112 disconnects the power reception connector 109 from the secondary cell 108. In this case, if the system unit 10 is active, the power is supplied from the secondary cell 108 to the keyboard circuit 111 via the selector switch 112. When the keyboard 100 is mounted on the system unit 10, the power is supplied from the system unit 10 to the secondary cell 108, meaning that the electric energy of the secondary cell 108 rarely decreases. When the system unit 10 enters the sleep status, the control unit 113 issues an instruction to the selector switch 112. Upon receiving this instruction, the selector switch 112 prevents the power from being supplied from the secondary cell 108 to the keyboard circuit 111. In this case, the power is not supplied from the primary cell 107 to the keyboard circuit 111 either. While the keyboard 100 is mounted on the system unit 10, only the central IR terminal 106*a* out of the three IR terminals 106*a*, 106*b*, and 106*c*, which is opposite to the IR terminal 21 for the keyboard of the system unit 10, is activated by the control unit 113.

When the keyboard 100 is moved away from the system unit 10, the power supply connector 57 of the system unit 10 also moves away from the power reception connector 109 and the power is not supplied from the system unit 10 to the secondary cell 108. During this period, all the IR terminals 106*a*, 106*b*, and 106*c* are activated by the control unit 113. When the system unit 10 is active, the secondary cell 108 is used first and the power is supplied from the secondary cell 108 to the keyboard circuit 111. Upon detecting that the electrical energy of the secondary cell 108 drops below a specified level, the control unit 113 issues an instruction to the selector switch 112 to allow the power to the keyboard circuit 111 to flow, not from the secondary cell 108, but from the primary cell 107. This cause the selector switch 112 to allow the power from the primary cell 107 to be supplied to the keyboard circuit 111. The control unit 113 also issues an instruction, via the IR terminals 106*a*, 106*b*, and 106*c*, to the system unit 10 to prompt the user to charge the secondary cell 108. When the electrical energy of the primary cell 107 also drops below a specified level, the control unit 113 issues an instruction, via the IR terminals 106*a*, 106*b*, and 107*c*, to the system unit 10 indicating that the primary cell 107, a battery, should be replaced. When the system unit 10 enters the sleep status, the control unit 113 sends an instruction to the selector switch 112 in the same manner as when the keyboard is mounted. Upon receiving this instruction, the selector switch 112 disconnects the power supplied from the secondary cell 108 and primary cell 107 to the keyboard circuit 111.

In this embodiment, with the keyboard 100 detached from the system unit 10, the secondary cell 108 is used first and then the primary cell 107 is used. Alternatively, the primary cell 107 may be used first and then the secondary cell 108 may be used. Or, a special switch may be provided on the system unit 10 and, through this switch, the system unit 10 may be switched from the sleep status to the active status or from the active status to the sleep status.

Some users may always keep the keyboard 100 separate from the system unit 10 regardless of whether or not the data processing unit is in use. For use by those users, it is desirable that a power supply cord which connects the power supply connector 57 on the system unit 10 to the power reception connector 109 on the keyboard 100 be provided. Or, as in a traditional system, a cord such as a curled cord may be used for connection. In this case, the primary cell storage 107*a*, which will not be used, may be used to store the curled cord.

As shown in FIGS. 15 to 17, the palm rest 140 comprises a track pad 141 which is one type of bonding device, a connector 142 connected to the palm rest connector 110 of the keyboard 100 when the system is available, a flat spring 143 which couples to the link claw 127*b* of the palm rest link mechanism 126 on the keyboard 100, and a palm rest cover 145 which covers those components.

The palm rest cover 145 comprises a top 146, a back 147, and sides 148*a* and 148*b*.

The palm rest 140, when stored, is in the palm rest storage 125*a*, with the top 146 of the palm rest cover 145 facing the top plate of the palm rest storage 125*a* of the keyboard 100. When in use, the palm rest 140 is mounted on the keyboard 100, with the front 123 of the keyboard 100 facing the back 147 of the palm rest cover 145.

Almost in the center of the top 146 of the palm rest cover there is provided the track pad 141. The part of the top 146 of the palm rest cover except the track pad 141 is used as the palm rest of the user when the user uses the keyboard 100.

A flat spring 143, which is on the back of the palm rest cover 145, faces the link unit 127 of the keyboard 100 when the palm rest 140 is used. As shown in FIG. 17, the flat spring 143 comprises a coupling part 143*a* which couples to the link claw 127*b* of the palm rest link unit 127 on the keyboard 100 and a disengage part 143*b* which pushes the link claw 127*b* of the link unit 127 backward. When the palm rest 140 is in use, the coupling part 143*a* of the flat spring 143 couples to the link claw 127*b* (coupled-to part) of the palm rest link unit 127 on the keyboard 100, and the disengage part 143*b* of the flat spring 143 pushes the link claw 127*b* of the link unit 127 backward, as shown in FIG. 17(*b*). At this time, the push-button 127*a* on the palm rest link unit 127, which is energized by the spring 128 of the palm rest link mechanism 126, projects over the top 121 of the keyboard 100. To detach the palm rest 140 from the keyboard 100 while it is in use, the push-button 127*a* on the palm rest link unit 127 on the keyboard 100 must be pushed as shown in FIG. 17(*c*). Then, the link claw 127*b* of the palm rest link unit 127 disengages from the coupling part 143*a* of the flat spring 143. Because the disengage part 143*b* of the flat spring 143 still pushes the link claw 127*b* of the palm rest link unit 127 backward at this time, the palm rest 140 is pushed forward with respect to the keyboard 100 as shown in FIG. 17 (*d*). Therefore, it moves away from the keyboard 100, as shown in FIG. 17 (*a*).

The following explains how the data processing system described above is used.

Figure 21:
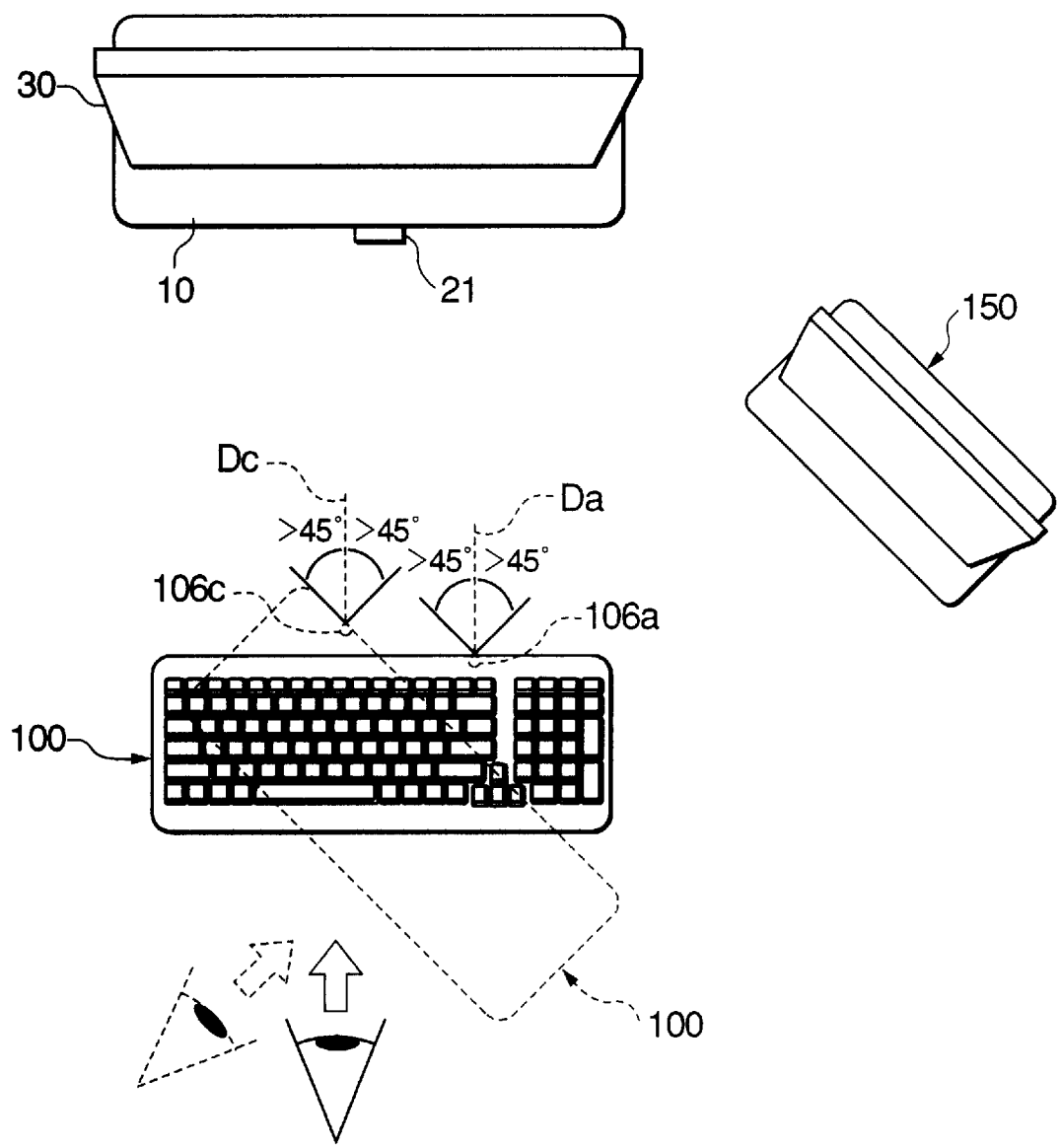
FIG. 21 is a diagram showing how the data processing unit of an embodiment according to the present invention is used. (1)
Figure 23:
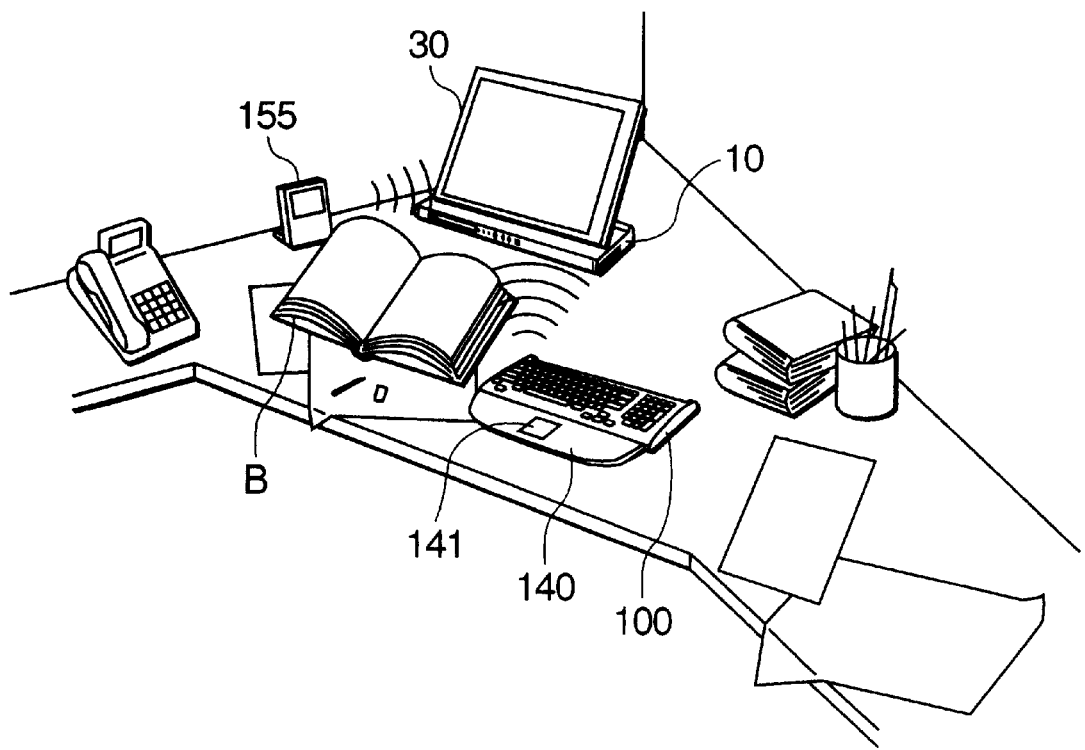
FIG. 23 is a diagram showing how the data processing unit of an embodiment according to the present invention is used. (3)

Because this data processing system uses a 15-inch TFT display panel 31 which is relatively large, it is desirable that the keyboard 100 be detached from the system unit 10 on which the display unit 30 is installed, as shown in FIGS. 21 to 23.

When the keyboard 100 is away from the system unit 10, the direction of the keyboard 100 toward the system unit 10 may vary as shown in FIG. 21 or, an obstacle, such as a book, between the system unit 10 and keyboard 100 may affect the transmission of signals between them as shown in FIG. 23. To solve this problem, a plurality of IR terminals 106*a*, 106*b*, and 106*c* are provided on the keyboard 100 in this embodiment to change the signal transmission/reception direction. A plurality of IR terminals 106a, 106b, and 106c are provided with one IR terminal 21 on the system unit 10 in this embodiment, one IR terminal may be provided on the keyboard 100 with a plurality of IR terminals on the system unit 10.

A securities firm clerk sometimes does his or her job while taking a look at stock market information once in a while. In such a case, instead of the display unit 30 on the system unit 10 which is mainly used, a relatively small-sized, for example a 13-inch sub-display unit 150 may be used separately to display data the system unit 10 has obtained from a LAN. This data is sent to that sub-display unit 150 via the VGA connector 67 and an image transmission cable 151 on the system unit 10. That is, in the above case, the sub-display unit 150 is positioned as a unit to display text data such as news.

Although the distance between the sub-display unit 150 and the user may depend on the user, the sub-display unit 150 may be placed nearer to the user so that the user can view same-sized characters on the display unit 30 and on the sub-display unit 150. Alternatively, they may be placed almost at the same distance from the user to eliminate the need for accommodation when the user changes the focus from the display unit 30 to the sub-display unit 150 and vice versa.

Through the keyboard 100, the user changes data to be displayed on the sub-display unit 150. A signal requesting to change data to be displayed on the sub-display unit 150 is issued from the IR terminals 106a, 106b, and 106c to the system unit 10. Then, the system unit 10 sends image data requested by the signal to the sub-display unit 150 via the VGA connector 67 and the image transmission cable 151 on the system unit 10. When making a request through the keyboard, the user may change the direction of the keyboard 100 toward the sub-display unit 150, as shown in FIG. 21. Even in this case, a plurality of IR terminals, 106a, 106b, and 106c on the keyboard 100, each having its own signal transmission/reception direction, allow the infrared signal to be sent reliably from the keyboard 100 to the system unit 10.

The system unit 10, which has the IR terminal 21 for the keyboard as well as IR terminal 63, enables data to be transferred to or from PDA155, called an electronic pocketbook or handheld computer, as shown in FIGS. 22 and 23.

As described before, this data processing unit is designed to meet the requirements of those people, such as sales managers or marketing managers, who must perform presentations at customer's sites. This system has the keyboard 100 separate from the system unit 10, allowing a sales manager to operate the display unit 30 at some distance from it. In addition, the system features a comparatively larger-sized, high-quality 15-inch TFT display 30, enabling three to six customers, at some distance from the display, to view display data clearly.

Therefore, the user can perform high-quality presentations easily. From the operability aspect, the user may use this easy-to-use system in basically the same manner as with standard personal computers most users are familiar with. From the high-quality presentation capability aspect, a full-color TFT display 30 appeals to customers who view it. This data processing unit also ensures flexibility in presentation. This is because not only traditional presentation software products but also other application software products may be used. For example, software application programs which allow customers to connect to WWW (World Wide Web), to perform teleconferencing, or to connect to multimedia titles may be used on this system.

This data processing unit has the following features that satisfy the requirements of users who perform to do presentations on customer's sites:
(1) A wide-angle TFT display 30 with a large, full-color, high-quality display surface 32
(2) Light-weight and portable
(3) Good design
(4) A wireless keyboard 100 detachable from the system unit 10
(5) A modem or a LAN communication port for easy access to information over communication lines
(6) A multimedia-compatible system unit for connection to a variety of audio units The following briefly explains the wide-angle display unit 30:

A conventional liquid-crystal display unit has a viewing angle of 60° to 90°. Therefore, when the display unit 30 is placed 8 feet away, only those in the horizontal range of 9 to 12 feet can view the display. On the other hand, the display unit 30 used in this embodiment has a viewing angle of 160° as described above. This means that, when the display unit is placed 8 feet away, those in the horizontal range of as wide as 90 feet can view the display. Thus, even if the surface size of the conventional crystal display unit is the same, the display unit 30 used in this embodiment enables more people to view the display at the same time.

The data processing unit also satisfies the requirements of those who are interested in style or size, including architect designers, graphic designers, Web designers, and business managers.

Figure 24:
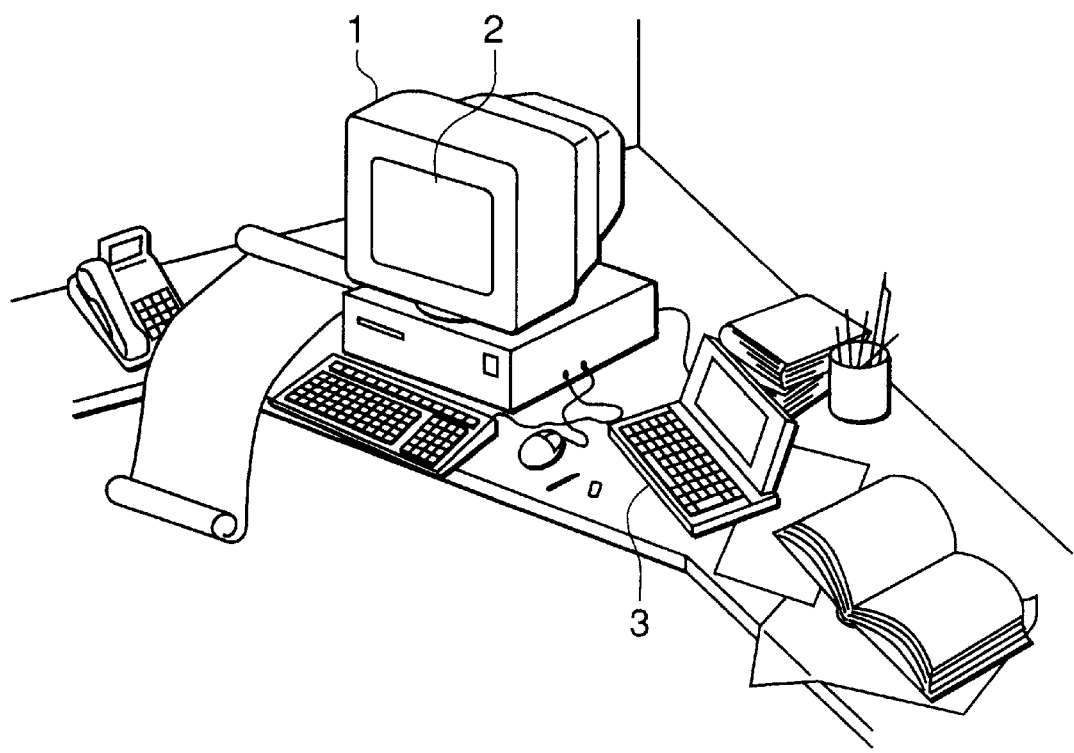
FIG. 24 is a diagram showing how a data processing unit of the prior art is used.

As shown in FIG. 23, this system saves desktop space, keeps the desktop uncluttered (in comparison with the desktop on which a data processing unit according to the prior art is installed as shown in FIG. 24), and is refined in design. All these factors are vital to building a neat, good-looking office. The use of a high-performance platform, implemented by the high-performance CPU 11 and the latest OS (operating system) such as Windows NT (a trademark of Microsoft Corp.), is another feature.

This data processing unit has many features satisfying the needs of users who are sensitive to the style and size. The features includes:
(1) Refined, space-saving design
(2) High performance
(3) A large flat panel display unit 30 and a wireless keyboard 100
(4) A communication port for a modem or an LAN for easy access to information over communication lines
(5) A multimedia-compatible system unit for connection to a variety of, for example, audio units In addition, this data processing unit is designed for users, including engineers, accountants, and consultants, who must work in the office and at home or at a plurality of sites.

Although designed primarily for users who need not carry the unit, this data processing unit is also portable and has a variety of communication functions. It is superior to a high-performance notebook computer in performance. More specifically, the data processing unit contains the high-performance CPU 11 and the latest operating system such as WindowsNT (a trademark of Microsoft Corp.), and has a 15-inch TFT display unit 30 and a full-size keyboard 100 with numeric keys.

To meet the requirements of users who work in their homes, this data processing unit has the following features:
(1) Light weight
(2) High performance
(3) A large flat panel display 30 with a wireless full-size keyboard 100 with numeric keys (4) A modem or a LAN communication port for easy access to information over communication lines The data processing unit according to the present invention, with the center of gravity of the display unit always in the upper area of the system unit, is always stable.

What is claimed is:

1. A data processing unit composed of a system unit containing a CPU which performs various types of data processing, a display unit having a flat display panel, and a keyboard capable of being attached to or detached from said system unit, said data processing unit comprising:

link means for linking said display unit to said system unit in such a manner that the display unit is adjustable between a closed state in which said display unit is in a position face to face with said keyboard and in which a center of gravity of the display unit is in an upper area of said system unit and an open state in which said display unit stands on said keyboard and in which the center of gravity of the display unit is in the upper area of the system unit; and said display unit has a bottom portion and a top portion, said top portion being the end opposite to the bottom portion, wherein, said link means comprises:
   a guide which is provided on said system unit and on which a guide path is formed;
   a slider which has a display linking part to link said bottom portion of said display unit pivotally and an engaging part sliding on said guide path on said guide; and
   a swinging arm which has two end portions, one end portion being linked to said system unit pivotally, the other end portion being linked to a portion of said display unit between said bottom portion and said top portion, and
   wherein said display unit, said slider, and said swinging arm constitute a slider clamp mechanism.

2. A data processing unit according to claim 1, wherein said system unit has a connection side to which said keyboard is connected and a back side which is on a side opposite to the connection side, and
   wherein said guide path on said guide runs from said connection side to said backside.

3. A data processing unit according to claim 1, further comprising a buffer which produces drag force at least immediately before said closed state when said display unit moves from said open state to said closed state.

4. A data processing unit according to claim 2, further comprising:
   a buffer which has elastic force working from the back side to the connection side and which comes into contact with said slider immediately before said display unit enters said closed state, said buffer being at a back of said guide.

5. A data processing unit according to claim 1 wherein said system unit has a connection side to which said keyboard is connected and a plurality of external connection terminals on said connection side.

6. A data processing unit according to claim 5 wherein at least one of said plurality of external terminals is a terminal for connecting an audio unit.

7. A data processing unit according to claim 1,
   wherein said keyboard comprises an alphanumeric key group composed of a plurality of alphanumeric keys, a function key group composed of a plurality of function keys, and a numeric key group located next to said alphanumeric key group and composed of a plurality of numeric keys, wherein said flat display panel has a rectangular effective display and wherein a diagonal of an effective display surface of said flat display panel is longer than a side of said alphanumeric key group and shorter than a sum of the side of said alphanumeric key group and the side of said numeric key group.

8. A data processing unit according to claim 7 wherein the diagonal of the effective display surface of said flat display panel is 15 inches to 18 inches.

9. A data processing unit composed of a system unit containing a CPU which performs various types of data processing, a display unit having a flat display panel, and a keyboard capable of being attached to or detached from said system unit, said data processing unit comprising:

link means for linking said display unit to said system unit in such a manner that the display unit is adjustable between a closed state in which said display unit is in a position face to face with said keyboard and in which a center of gravity of the display unit is in an upper area of said system unit and an open state in which said display unit stands on said keyboard and in which the center of gravity of the display unit is in the upper area of the system unit;

wherein one of said system unit and said keyboard has at least one signal receiving/sending means for receiving/sending wireless signals and wherein the other of said system unit and said keyboard has a plurality of signal receiving/sending means, each having a unique position and a unique direction, for sending and receiving wireless signals to or from said at least one signal receiving/sending means.

10. A data processing unit according to claim 9 wherein said system unit has a connection side to which said keyboard is connected and a plurality of external connection terminals on said connection side.

11. A data processing unit according to claim 9, further comprising:
    a palm rest with a pointing device,
    wherein said keyboard is composed of a top where a plurality of keys are arranged, a storage part which is under the top and into or from which said palm rest is stored and removed, and a front which is contiguous to the edge of the top and from which a user can see said plurality of keys properly, wherein said palm rest has a connection side connected to said front of said keyboard, a coupling part which couples said connection side to the front of the keyboard, and a terminal which transfers signals between said pointing device and said keyboard, and wherein said keyboard has a coupled-to part to which coupling means of said palm rest couples and a terminal which connects to the terminal on the palm rest when the keyboard is connected to said palm rest.

12. A data processing unit according to claim 9, wherein said keyboard comprises an alphanumeric key group composed of a plurality of alphanumeric keys, a function key group composed of a plurality of function keys, and a numeric key group located next to said alphanumeric key group and composed of a plurality of numeric keys wherein said flat display panel has a rectangular effective display and wherein a diagonal of said effective display surface is longer than a side of said alphanumeric key group and shorter than a sum of the side of said alphanumeric key group and the side of said numeric key group.

13. A data processing unit composed of a system unit containing a CPU which performs various types of data processing, a display unit having a flat display panel, and a keyboard capable of being attached to or detached from said system unit, said data processing unit comprising:

link means for linking said display unit to said system unit in such a manner that the display unit is adjustable between a closed state in which said display unit is in a position face to face with said keyboard and in which a center of gravity of the display unit is in an upper area of said system unit and an open state in which said display unit stands on said keyboard and in which the center of gravity of the display unit is in the upper area of the system unit; wherein, said system unit comprises:
  a power supply circuit supplying power to active parts of said system unit, including said CPU; and
  a power supply terminal through which power is supplied from said power supply circuit to said keyboard; and wherein said keyboard comprises:
  a primary cell storage part containing a primary cell supplying power to active parts on said keyboard and a secondary cell supplying power to the active parts on said keyboard;
  a power receiving terminal connected to said secondary cell and, when said keyboard is mounted on said system unit, connected to said power supply terminal on said system unit;
  switching means for allowing one of said primary cell and said secondary cell to supply power to the active parts on said keyboard; and
  control means for instructing said switching means to use one of said primary cell and said secondary cell, for detecting an electrical energy of said primary cell and said secondary cell, and, upon detecting that the electric energy of said one of said primary and said secondary cell has dropped below a specified level, for instructing said switching means to use the other of said primary and said secondary cells.

14. A data processing unit composed of a system unit containing a CPU which performs various types of data processing, a display unit having a flat display panel, and a keyboard capable of being attached to or detached from said system unit, said data processing unit comprising:

link means for linking said display unit to said system unit in such a manner that the display unit is adjustable between a closed state in which said display unit is in a position face to face with said keyboard and in which a center of gravity of the display unit is in an upper area of said system unit and an open state in which said display unit stands on said keyboard and in which the center of gravity of the display unit is in the upper area of the system unit;

wherein one of said system unit and said keyboard has at least one signal receiving/sending means for receiving/sending wireless signals and wherein the other of said system unit and said keyboard has a plurality of signal receiving/sending means each having a unique position and a unique direction, for sending and receiving wireless signals to or from said at least one signal receiving/sending means; wherein, said system unit comprises:
  a power supply circuit supplying power to active parts of said system unit including said CPU; and
  a power supply terminal through which power is supplied from said power supply circuit to said keyboard; and wherein said keyboard comprises:
  a primary cell storage part containing a primary cell supplying power to active parts on said keyboard and a secondary cell supplying power to the active parts on said keyboard;
  a power receiving terminal connected to said secondary cell and, when said keyboard is mounted on said system unit, connected to said power supply terminal on said system unit;
  switching means for allowing one of said primary cell and said secondary cell to supply power to the active parts on said keyboard; and
  control means for instructing said switching means to use one of said primary cell and said secondary cell, for detecting an electrical energy of said primary cell and said secondary cell, and, upon detecting that the electric energy of said one of said primary and said secondary cell has dropped below a specified level, for instructing said switching means to use the other of said primary and said secondary cells.

15. A data processing unit composed of a system unit containing a CPU which performs various types of data processing, a display unit having a flat display panel, and a keyboard capable of being attached to or detached from said system unit, said data processing unit comprising:

link means for linking said display unit to said system unit in such a manner that the display unit is adjustable between a closed state in which said display unit is in a position face to face with said keyboard and in which a center of gravity of the display unit is in an upper area of said system unit and an open state in which said display unit stands on said keyboard and in which the center of gravity of the display unit is in the upper area of the system unit;

said data processing unit further comprising:
  a CPU fan sending air to said CPU to cool the CPU; and
  a cooling fin effectively radiating heat generated by said CPU, wherein said cooling fin has a fan storage part where said CPU fan is stored and wherein said CPU, said cooling fin, and said CPU fan are integrated in such a manner that said CPU fan which is stored in said fan storage part is installed on the cooling fin and said cooling fin is in contact with said CPU or with a board on which the CPU is installed either directly or through high thermal conductivity material.

16. A data processing unit according to claim 15, further comprising:

a part cooling fan which sends air to active parts except said CPU to cool active parts; and an air flow path component composed of a first air flow path through which air from said CPU fan flows and a second air flow path through which air from said part cooling fan flows.

17. A data processing unit composed of a system unit containing a CPU which performs various types of data processing, a display unit having a flat display panel, and a keyboard capable of being attached to or detached from said system unit, said data processing unit comprising:

link means for linking said display unit to said system unit in such a manner that the display unit is adjustable between a closed state in which said display unit is in a position face to face with said keyboard and in which a center of gravity of the display unit is in an upper area of said system unit and an open state in which said display unit stands on said keyboard and in which the center of gravity of the display unit is in the upper area of the system unit;

said data processing unit further comprising:

a palm rest with a pointing device, wherein said keyboard is composed of a top where a plurality of keys are arranged, a storage part which is under the top and into or from which said palm rest is stored and removed, and a front which is contiguous to an edge of the top and from which a user can see said plurality of keys properly, wherein said palm rest has a connection side connected to said front of said keyboard, a coupling part which couples said connection side to the front of the keyboard, and a terminal which transfers signals between said pointing device and said keyboard, and wherein said keyboard has a coupled-to part to which coupling means of said palm rest couples and a terminal which connects to the terminal on the palm rest when the keyboard is connected to said palm rest.

18. A data processing unit comprising a system unit containing a CPU which performs various types of data processing and a keyboard capable of being attached to or detached from said system unit, wherein one of said system unit and said keyboard has at least one signal receiving/sending means for receiving/sending wireless signals and the other of said system unit and said keyboard has a plurality of signal receiving/sending means each having a unique position and a unique direction, for sending and receiving wireless signals to or from said one or more signal receiving/sending means, wherein each of said system unit and said keyboard has connection sides, facing with each other, when said keyboard is mounted on said system unit and wherein said one of said system unit and said keyboard has one said receiving/sending means on said connection side and other of said system unit and said keyboard has a constantly-used signal receiving/sending means that is one of said plurality of signal receiving/sending means and that is in a position facing said at least one signal receiving/sending means installed on said one of system unit and said keyboard, said processing unit further comprising:

mount detection means for detecting whether or not said keyboard is mounted on said system unit; and control means for making said one constantly-used signal receiving/sending means on said other of said system unit and said keyboard available for use when said mount detection means detects that said keyboard has been mounted one said system unit and for making all of said plurality of signal receiving/sending means on said other of said system unit and said keyboard available for use when said mount detection means detects that said keyboard has been removed from being on said system unit.

* * * * *